US008850023B2

(12) United States Patent (10) Patent No.: US 8,850,023 B2
Yamashima (45) Date of Patent: Sep. 30, 2014

(54) METHOD FOR CHANGING PLACEMENT OF VIRTUAL MACHINE AND APPARATUS FOR CHANGING PLACEMENT OF VIRTUAL MACHINE

(75) Inventor: Hiroyuki Yamashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 13/398,288

(22) Filed: Feb. 16, 2012

(65) Prior Publication Data

US 2012/0216053 A1 Aug. 23, 2012

(30) Foreign Application Priority Data

Feb. 22, 2011 (JP) ................. 2011-036486

(51) Int. Cl.
*G06F 15/173* (2006.01)
*G06F 9/50* (2006.01)

(52) U.S. Cl.
CPC ............ *G06F 9/5077* (2013.01); *G06F 9/5066* (2013.01)
USPC ......................................... 709/226; 709/223

(58) Field of Classification Search
USPC ................. 709/223, 226
See application file for complete search history.

(56) References Cited

U.S. PATENT DOCUMENTS

| | | | |
|---|---|---|---|
| 2007/0204266 A1* | 8/2007 | Beaty et al. | 718/1 |
| 2007/0271560 A1* | 11/2007 | Wahlert et al. | 718/1 |
| 2009/0150896 A1 | 6/2009 | Tsushima et al. | |
| 2010/0115509 A1* | 5/2010 | Kern et al. | 718/1 |
| 2010/0161805 A1* | 6/2010 | Yoshizawa et al. | 709/226 |

FOREIGN PATENT DOCUMENTS

| | | |
|---|---|---|
| JP | 2007-200346 | 8/2007 |
| JP | 2009-140157 | 6/2009 |
| JP | 2010-146420 | 7/2010 |

OTHER PUBLICATIONS

Extended European Search Report issued Mar. 4, 2014 in corresponding European Patent Application No. 12156161.7.
Fabien Hermenier, et al. "Entropy: a Consolidation Manager for Clusters", Mar. 11-13, 2009, VEE'09: Proceedings of the 2009 AMC Sigplan/Sigops International Conference on Virtual Execution Evironments, Washington, DC, USA; Mar. 11-13, 2009, AMC Press, US, pp. 41-50, XP007911484.
Anton Beloglazov, et al., "A Taxonomy and Survey of Energy-Efficient Data Centers and Cloud Computing Systems", Advances In Computer, Academic Press Inc, Amsterdam; Boston, vol. 82, Jan. 1, 2011, pp. 1-49, XP002712537.

(Continued)

*Primary Examiner* — Wing F Chan
*Assistant Examiner* — Andrew Woo
(74) *Attorney, Agent, or Firm* — Staas & Halsey LLP

(57) ABSTRACT

A method for changing a deployment of a virtual machine performed by a computer, at least one of the virtual machines deployed respectively in M physical machines, the method includes obtaining, by the computer, information of remaining capacities of the physical machines from the M physical machine, the remaining capacities which indicate how many virtual machines are deployed in the physical machines, changing, by the computer, the deployment of a virtual machine deployed in the M physical machines to M+N−1 or less physical machines among the M physical machines when a number of physical machines of which remaining capabilities are equal to or greater than a predetermined capability is less than a predetermined number by N.

10 Claims, 33 Drawing Sheets

(56) References Cited

OTHER PUBLICATIONS

Anton Beloglazov, et al. "Energy Efficient Allocation of Virtual Machines in Cloud Data Centers", May 17, 2010, Cluster, Cloud and Grid Computing (CCGRID), 2010 10$^{th}$ IEEE/ACM International Conference, IEEE, Piscataway, NJ, USA, pp. 577-578, XP031695764.

Anton Beloglazov, et al. "Energy Efficient Resource Management in Virtualized Cloud Data Centers", May 17, 2010, Cluster, Cloud and Grid Computing (CCGRID), 2010 10$^{th}$ IEEE/ACM International Conference, IEEE, Piscataway, NJ, USA, pp. 826-831, XP031695712.

* cited by examiner

FIG. 5A

| REQUEST ID | TENANT ID | QUANTITY | CAPABILITY | MANAGEMENT ID |
|---|---|---|---|---|
| R#1 | A | 5 | 3 | R#1-1, R#1-4, R#1-5 |
| R#2 | B | 4 | 5 | R#2-1 TO R#2-4 |
| R#3 | C | 4 | 4 | R#3-1 TO R#3-4 |
| ... | ... | ... | ... | ... |

FIG. 5B

| REQUEST ID | TENANT ID: A | TENANT ID: B | TENANT ID: C | PHYSICAL MACHINE |
|---|---|---|---|---|
| CPU (GHz) | 3.0 | 4.0 | 5.0 | 10.0 |
| MEMORY (GB) | 5.1 | 6.8 | 8.5 | 17.0 |

| PHYSICAL MACHINE ID | POWER ON/OFF | CAPABILITY |
|---|---|---|
| M#1 | ON | 10 |
| M#2 | OFF | 10 |
| M#3 | ON | 10 |
| M#4 | ON | 10 |
| M#5 | ON | 10 |
| M#6 | ON | 10 |
| M#7 | ON | 10 |
| M#8 | ON | 10 |
| M#9 | ON | 10 |
| M#10 | OFF | 10 |

FIG. 6B

| PHYSICAL MACHINE ID | POWER ON/OFF | CAPABILITY |
|---|---|---|
| M#1 | ON | 10 |
| M#2 | ON | 10 |
| M#3 | ON | 10 |
| M#4 | ON | 10 |
| M#5 | ON | 10 |
| M#6 | TEMPORARY ON | 10 |
| M#7 | OFF | 10 |
| M#8 | OFF | 10 |
| M#9 | OFF | 10 |
| M#10 | OFF | 10 |

| PHYSICAL MACHINE ID | POWER ON/OFF | CAPABILITY |
|---|---|---|
| M#1 | ON | 10 |
| M#2 | ON | 10 |
| M#3 | ON | 10 |
| M#4 | ON | 10 |
| M#5 | ON | 10 |
| M#6 | TEMPORARY ON | 10 |
| M#7 | TEMPORARY ON | 10 |
| M#8 | OFF | 10 |
| M#9 | OFF | 10 |
| M#10 | OFF | 10 |

| PHYSICAL MACHINE ID | USE INFORMATION | DIFFERENCE INFORMATION | CURRENT REMAINING CAPABILITY |
|---|---|---|---|
| M#1 | R#1-1, R#2-1 | NONE | 2 |
| M#2 | R#1-2, R#2-2 | NONE | 2 |
| M#3 | R#1-3, R#3-1 | "R#3-1 ADDED" | 3 |
| M#4 | R#1-4, R#3-2 | "R#3-2 ADDED" | 3 |
| M#5 | R#1-5, R#3-3 | "R#3-3 ADDED" | 3 |
| M#6 | R#2-3, R#3-4 | "R#3-4 ADDED" | 1 |
| M#7 | R#2-4 | NONE | 5 |
| M#8 | NOT USED | NONE | 10 |
| M#9 | NOT USED | NONE | 10 |
| M#10 | NOT USED | NONE | 10 |

FIG. 7B

| PHYSICAL MACHINE ID | USE INFORMATION | DIFFERENCE INFORMATION | CURRENT REMAINING CAPABILITY |
|---|---|---|---|
| M#1 | R#1-1 | "R#1-1 ADDED" | 7 |
| M#2 | R#1-2 | "R#1-2 ADDED" | 7 |
| M#3 | R#1-3 | "R#1-3 ADDED" | 7 |
| M#4 | R#1-4 | "R#1-4 ADDED" | 7 |
| M#5 | R#1-5 | "R#1-5 ADDED" | 7 |
| M#6 | NOT USED | NONE | 10 |
| M#7 | NOT USED | NONE | 10 |
| M#8 | NOT USED | NONE | 10 |
| M#9 | NOT USED | NONE | 10 |
| M#10 | NOT USED | NONE | 10 |

FIG. 7C

| PHYSICAL MACHINE ID | USE INFORMATION | DIFFERENCE INFORMATION | CURRENT REMAINING CAPABILITY |
|---|---|---|---|
| M#1 | R#1-1, R#2-1 | NONE | 2 |
| M#2 | R#1-2, R#2-2 | NONE | 2 |
| M#3 | R#1-3, R#2-3 | NONE | 2 |
| M#4 | R#1-4 | "R#2-4 TEMPORARY MOVEMENT:OUT" | TEMPORARY 7 |
| M#5 | R#1-5 | NONE | 7 |
| M#6 | TEMPORARY R#2-4 | "R#2-4 TEMPORARY MOVEMENT:IN" | TEMPORARY 5 |
| M#7 | NOT USED | NONE | 10 |
| M#8 | NOT USED | NONE | 10 |
| M#9 | NOT USED | NONE | 10 |
| M#10 | NOT USED | NONE | 10 |

FIG. 7D

| PHYSICAL MACHINE ID | USE INFORMATION | DIFFERENCE INFORMATION | CURRENT REMAINING CAPABILITY |
|---|---|---|---|
| M#1 | R#1-1, R#2-1 | NONE | 2 |
| M#2 | R#1-2, R#2-2 | NONE | 2 |
| M#3 | R#1-3 | "R#2-3 TEMPORARY MOVEMENT:OUT" | TEMPORARY 7 |
| M#4 | R#1-4 | "R#2-4 TEMPORARY MOVEMENT:OUT" | TEMPORARY 7 |
| M#5 | R#1-5 | NONE | 7 |
| M#6 | TEMPORARY R#2-4 | "R#2-4 TEMPORARY MOVEMENT:IN" | TEMPORARY 5 |
| M#7 | TEMPORARY R#2-3 | "R#2-3 TEMPORARY MOVEMENT:IN" | TEMPORARY 5 |
| M#8 | NOT USED | NONE | 10 |
| M#9 | NOT USED | NONE | 10 |
| M#10 | NOT USED | NONE | 10 |

FIG. 8A

| MANAGEMENT ID | REQUEST ID | MOVEMENT SOURCE | MOVEMENT DESTINATION |
|---|---|---|---|
| R#3-1 | R#3 | NONE | M#3 |
| R#3-2 | R#3 | NONE | M#4 |
| R#3-3 | R#3 | NONE | M#5 |
| R#3-4 | R#3 | NONE | M#6 |

FIG. 8B

| MANAGEMENT ID | REQUEST ID | MOVEMENT SOURCE | MOVEMENT DESTINATION |
|---|---|---|---|
| R#3-4 | R#3 | M#6 | M#8 |

FIG. 8C

| MANAGEMENT ID | REQUEST ID | MOVEMENT SOURCE | MOVEMENT DESTINATION |
|---|---|---|---|
| R#1-2 | R#4 | M#2 | NONE |
| R#1-3 | R#4 | M#3 | NONE |

| MANAGEMENT ID | REQUEST ID | MOVEMENT SOURCE | MOVEMENT DESTINATION |
|---|---|---|---|
| R#2-4 | R#2 | M#4 | TEMPORARY M#6 |

| MANAGEMENT ID | REQUEST ID | MOVEMENT SOURCE | MOVEMENT DESTINATION |
|---|---|---|---|
| R#2-4 | R#2 | M#4 | TEMPORARY M#6 |
| R#2-3 | R#2 | M#3 | TEMPORARY M#7 |

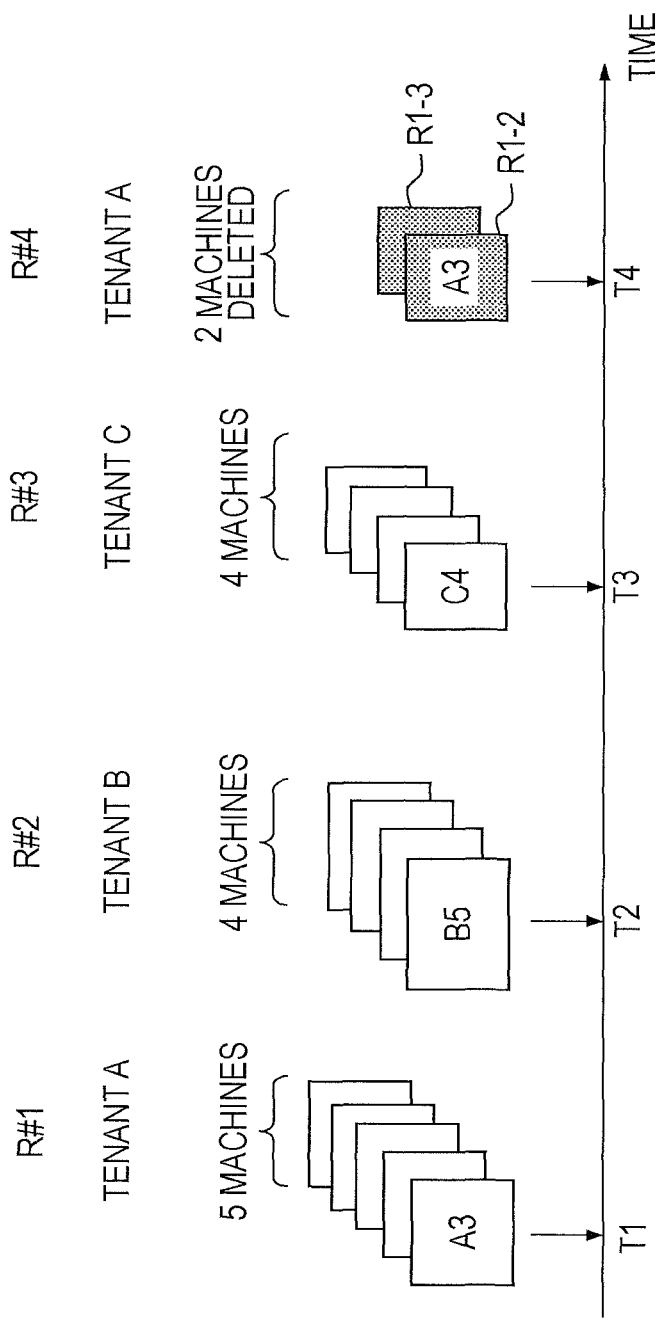

FIG. 21

| REQUEST ID | TENANT ID | QUANTITY | CAPABILITY | MANAGEMENT ID | TIME |
|---|---|---|---|---|---|
| R#1 | A | 5 | 3 | R#1-1 TO R#1-5 | T1 |
| | DUMMY VIRTUAL MACHINE | 5 | 5 | R#D-1 TO R#D-5 | |
| R#2 | B | 4 | 5 | R#2-1 TO R#2-4 | T2 |
| | DUMMY VIRTUAL MACHINE | 5 | 5 | R#D-1 TO R#D-5 | |
| R#3 | C | 4 | 4 | R#3-1 TO R#3-4 | T3 |
| | DUMMY VIRTUAL MACHINE | 5 | 5 | R#D-1 TO R#D-5 | |

33A

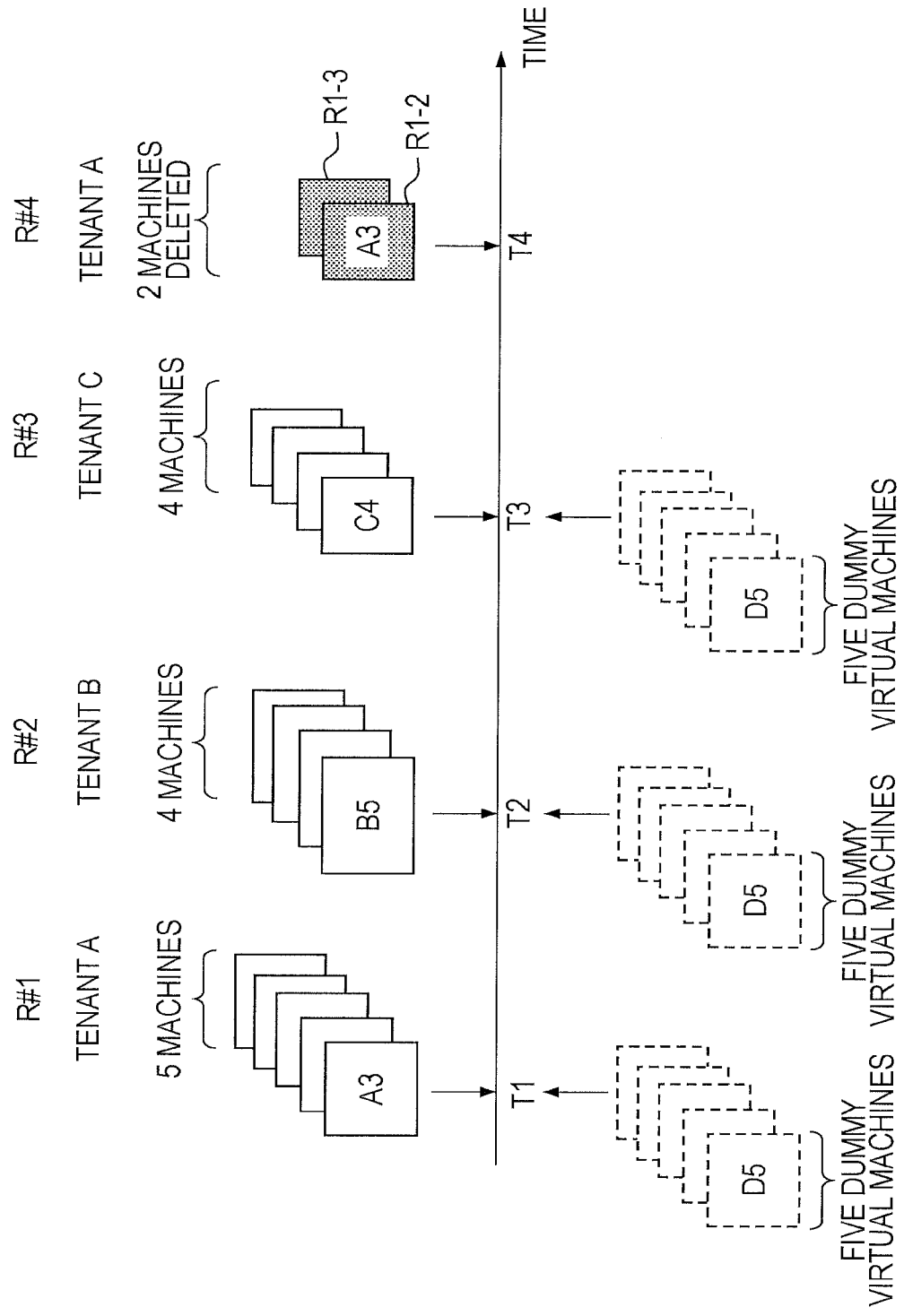

METHOD FOR CHANGING PLACEMENT OF VIRTUAL MACHINE AND APPARATUS FOR CHANGING PLACEMENT OF VIRTUAL MACHINE

CROSS-REFERENCE TO RELATED APPLICATION

This application is based upon and claims the benefit of priority of the prior Japanese Patent Application No. 2011-36486 filed on Feb. 22, 2011, the entire contents of which are incorporated herein by reference.

FIELD

The embodiments discussed herein are related to a method for changing a placement of a virtual machine and an apparatus for changing an placement of a virtual machine.

BACKGROUND

In recent years, with an information processing system including multiple servers (physical machines) such as a data center, in order to effectively handle increase in the number of uses thereof, the types of services, and the number of services, on the OS (Operating System) of each physical machine there are used multiple virtual machines which emulate the physical machine.

According to the technology in the past, a virtual machine may freely be activated and operated on a physical machine. However, when attempting to secure a predetermined number of physical machines of which the remaining capabilities are equal to or greater than a predetermined capability in preparation for further arrangement of a virtual machine, one or more virtual machines are being operated, and the total number of physical machines of which the remaining capabilities are equal to or greater than a predetermined capability exceeds a predetermined number, i.e., an excess state occurs. Also, when attempting to secure a predetermined number of physical machines of which the remaining capabilities are equal to or greater than a predetermined capability in preparation for further arrangement of a virtual machine, the total number of physical machines may tend to increase. In such a situation, attempting to secure a predetermined number of physical machines of which the remaining capabilities are equal to or greater than a predetermined capability in preparation for further arrangement of a virtual machine causes increase in the total number of physical machines used for this, and also causes increase in power consumption.

SUMMARY

According to an aspect of an embodiment, a method for changing a deployment of a virtual machine performed by a computer, at least one of the virtual machines deployed respectively in M physical machines, the method includes obtaining, by the computer, information of remaining capacities of the physical machines from the M physical machine, the remaining capacities which indicate how many virtual machines are deployed in the physical machines, changing, by the computer, the deployment of a virtual machine deployed in the M physical machines to M+N−1 or less physical machines among the M physical machines when a number of physical machines of which remaining capabilities are equal to or greater than a predetermined capability is less than a predetermined number by N, the remaining capacities indicating capacities of deploying at least one of the virtual machines in the physical machine, wherein the changing is performed when the number of physical machines of which the remaining capabilities are equal to or greater than the predetermined capability reaches the predetermined number among the M+N−1 or less physical machines after the changing is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a diagram illustrating an example of a request information storage unit of the information processing system according to the first embodiment, and request information to be stored in the request information storage unit;

FIG. 5B is a diagram illustrating an example of the request information storage unit of the information processing system according to the first embodiment, a virtual machine to be stored in the request information storage unit, and the capability of a physical machine;

FIG. 6A is a diagram illustrating an example of a physical machine information storage unit of the information processing system according to the first embodiment, and physical machine information to be stored in the physical machine information storage unit;

FIG. 6B is a diagram illustrating an example of a physical machine information storage unit of the information processing system according to the first embodiment, and physical machine information to be stored in the physical machine information storage unit;

FIG. 6C is a diagram illustrating an example of a physical machine information storage unit of the information processing system according to the first embodiment, and physical machine information to be stored in the physical machine information storage unit;

FIG. 7A is a diagram illustrating an example of an arrangement information storage unit of the information processing system according to the first embodiment, and arrangement design information to be stored in the arrangement information storage unit;

FIG. 7B is a diagram illustrating an example of an arrangement information storage unit of the information processing system according to the first embodiment, and arrangement design information to be stored in the arrangement information storage unit;

FIG. 7C is a diagram illustrating an example of an arrangement information storage unit of the information processing system according to the first embodiment, and arrangement design information to be stored in the arrangement information storage unit;

FIG. 7D is a diagram illustrating an example of an arrangement information storage unit of the information processing system according to the first embodiment, and arrangement design information to be stored in the arrangement information storage unit;

FIG. 8A is a diagram illustrating an example of an arrangement information/movement information storage unit according to the first embodiment, and movement information to be stored in the arrangement information/movement information storage unit;

FIG. 8B is a diagram illustrating an example of an arrangement information/movement information storage unit according to the first embodiment, and movement information to be stored in the arrangement information/movement information storage unit;

FIG. 8C is a diagram illustrating an example of an arrangement information/movement information storage unit according to the first embodiment, and movement information to be stored in the arrangement information/movement information storage unit;

FIG. 8D is a diagram illustrating an example of an arrangement information/movement information storage unit according to the first embodiment, and movement information to be stored in the arrangement information/movement information storage unit;

FIG. 8E is a diagram illustrating an example of an arrangement information/movement information storage unit according to the first embodiment, and movement information to be stored in the arrangement information/movement information storage unit;

FIG. 11 is a diagram illustrating input of an assignment request according to the information processing system of the first embodiment;

FIG. 21 is a diagram illustrating an example of a request information storage unit of the information processing system according to the second embodiment, and request information to be stored in the request information storage unit;

FIG. 22 is a diagram illustrating an example of a stand-by physical machine request information storage unit according to the second embodiment, and stand-by physical machine request information to be stored in the stand-by physical machine request information storage unit;

DESCRIPTION OF EMBODIMENTS

Embodiments will be described below in detail with the drawings.

Figure 1:
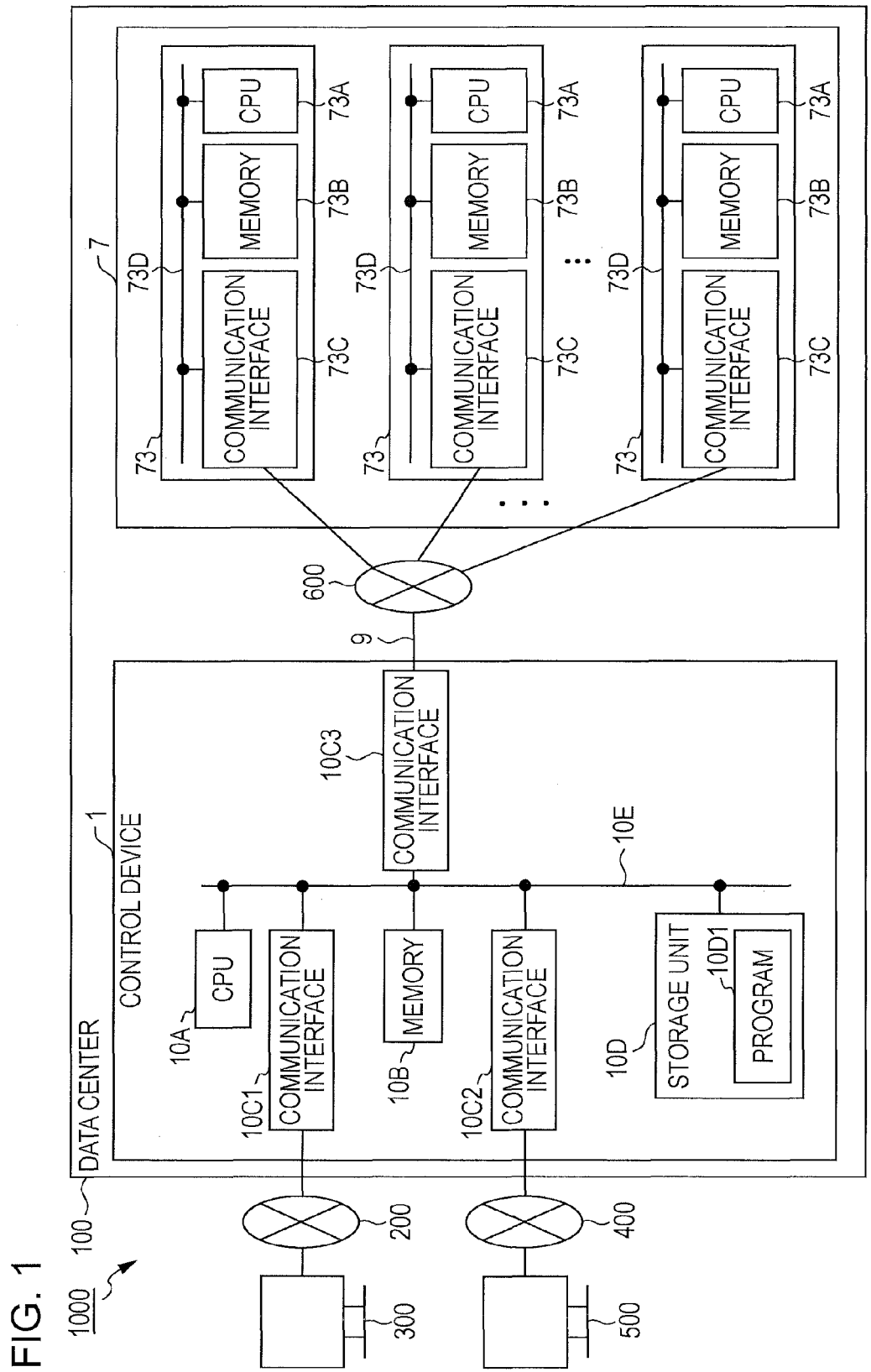
FIG. 1 is a diagram illustrating an example of the hardware configuration of an information processing system according to a first embodiment.

FIG. 1 is a diagram illustrating an example of the hardware configuration of an information processing system 1000 according to a first embodiment. Note that resources in the first embodiment and a later-described second embodiment indicate resources of a physical machine group 7 that a user may use using a virtual machine.

An information processing system 1000 includes a data center 100, a user terminal 300, a resource request terminal 500, a network 200 which connects between the data center 100 and the user terminal 300, and a network 400 which connects between the data center 100 and a resource request terminal 500. The data center 100 arranges a single or multiple virtual machines used by the user on a single or multiple physical machines 73. The data center 100 allows the user to use a virtual machine from the user terminal 300. The network 200 and network 400 are the Internet or dedicated lines, for example. The user terminal 300 is a computer which used a virtual machine of the data center 100. The resource request terminal 500 is a computer which requests a single or multiple virtual machines which the user intends to use as to the data center 100, for example.

1,000 physical machines 73, for example, are arranged with the data center 100. Multiple virtual machines are arranged on one physical machine 73. Accordingly, for example, 5,000 to 10,000 virtual machines overall may be provided to the data center 100.

The data center 100 includes a control device 1, a physical machine group 7, and a network 600 which connects between the control device 1 and the machine group 7. The network 600 is an intranet or dedicated line, for example.

The control device 1 includes, for example, a CPU (Central Processing Unit) 10A serving as an example of processors, memory 10B, a communication interface 10C1, a communication interface 10C2, a communication interface 10C3, a storage unit 10D, and a bus 10E. The control device 1 controls the physical machine group 7 to arrange a virtual machine on the physical machines 73 (see FIG. 3) of the physical machine 7. The control device 1 instructs, at the time of performing assignment of a virtual machine, the physical machine 73 where a virtual machine which the user specified may be arranged, so as to serve as a virtual machine for the user. The physical machine 73 which received this instruction from the control device 1 activates software which realizes a virtual machine.

Note that, according to arrangement of a virtual machine, the virtual machine is activated on the activated physical machine 73. Upon the virtual machine being arranged on the physical machine 73 according to request information thereof, the resource request terminal 500 may possess the right of use or a part of the custodial right as to the virtual machine thereof.

The CPU 10A controls the whole of the control device 1. The CPU 10A is connected to the memory 1B, communication interface 10C1, communication interface 10C2, and communication interface 10C3 via the bus 10E.

The memory 10B may temporarily record an OS (Operating System) program, application programs, and a control program 8A for controlling the physical machine group 7, which the CPU 10A executes, for example. Also, the storage unit 10D records various types of data necessary for processing in the CPU 10A.

The communication interface 10C1 is provided for the control device 1 being connected to the user terminal 300 via the network 200. The communication interface 10C1 performs transmission/reception of data between the user terminal 300 and the control device 1. The communication interface 10C2 is provided for the control device 1 being connected to the resource request terminal 500 via the network 400. The communication interface 10C2 performs transmission/reception of data between the resource request terminal 500 and the control device 1. The communication interface 10C3 is provided for the control device 1 being connected to the physical machine 73 via the network 600. The communication interface 10C3 performs transmission/reception of data between the resource request terminal 500 and the control device 1.

The storage unit 10D may temporally record the OS program, application programs, and a control program 10D1 for controlling the physical machine groups 7, which the CPU included in the control device 1 executes, for example. Also, the storage unit 10D records various types of data necessary for processing in the CPU included in the control device 1. The storage unit 10D is a hard disk drive (HDD), for example.

Note that the control program 10D1 may be held by other than the storage unit 10D. The control program 10D1 is recorded in a "portable physical storage medium" such as a flexible disk (FD), CD-ROM, MO disk, DVD disc, magneto-optical disk, IC card, or the like which is inserted into the data center 100, for example. The control program 10D1 is stored in a disk device provided in the inside/outside of the data center 100, or the storage unit 10D held by another computer (or server) to be connected to the data center 100 via the network 200, network 400, public line, Internet, LAN (Local Area Network), WAN (Wide Area Network), or the like. The data center 100 reads out the control program 10D1 from the storage unit 10D for execution.

The physical machine group 7 includes multiple physical machines 73. A virtual machine is arranged on the physical machines 73.

The physical machines 73 include, for example, a CPU 73A, memory 73B, a communication interface (I/F) 73C, and a bus 73D.

The CPU 73A controls the whole of the physical machine 73. The CPU 73A is connected with the memory 73B and communication interface 73C via the bus 73D.

The memory 73 may temporarily record, for example, the OS program, application programs, and a control program 8A for controlling the physical machine group 7, which the CPU 73A executes. Also, the memory 73B may record various types of data necessary for processing in the CPU 73A.

The communication interface 73C is provided for the physical machine 73 being connected to the control device 1 via the network 600. The communication interface 73C performs transmission/reception of data between the physical machine 73 and the control device 1.

Now, the control device 1 is built on the physical machines 73 as an example.

The resource request terminal 500 transmits a virtual machine assignment request to the data center 100 via the network 400. The assignment request is issued, for example, in the event of using a new virtual machine, in the event of desiring to change the quantity of the physical machines, or the like. Upon the data center 100 arranging a virtual machine on the physical machine 73 in response to the assignment request, the user terminal 300 may use a resource by being connected to the physical machine 73 where the virtual machine is arranged via the network 200.

Note that the user terminal 300 and resource request terminal 500 may be the same physical machine 73, and the network 200 and network 400 may be the same network.

Figure 2:
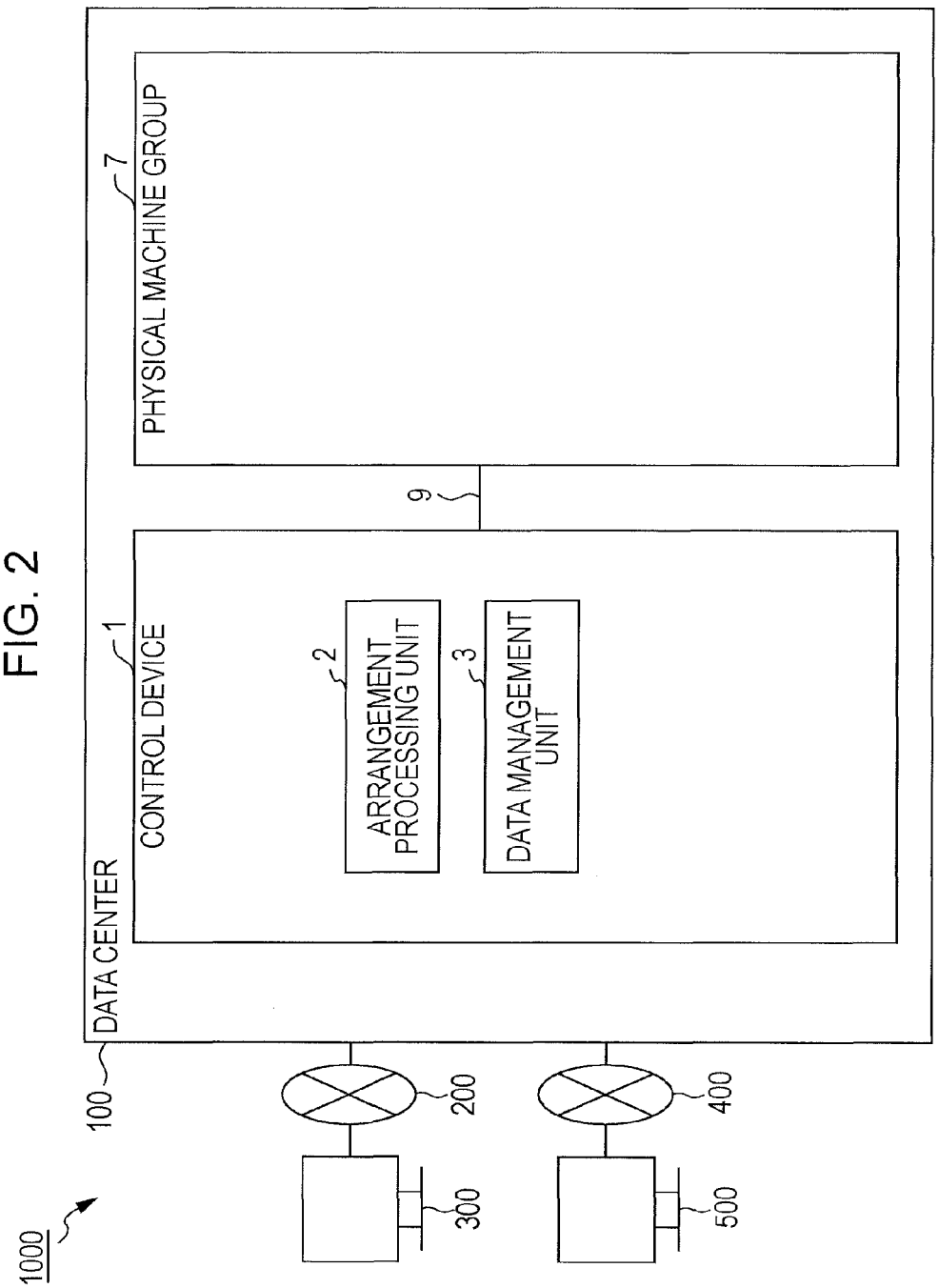
FIG. 2 is a diagram illustrating an example of the function block diagram of the information processing system according to the first embodiment.

FIG. 2 is a diagram illustrating an example of the function block diagram of the information processing system 1000 according to the first embodiment. Note that, in FIG. 2, the same configurations as the configurations described in FIG. 1, the same reference numerals are appended thereto, and description thereof will be omitted.

With the control device 1 (computer), the processor executes processing in accordance with the program, whereby the arrangement processing unit 2 and data management unit (storage unit) 3 have the corresponding functions, respectively. The control device 1 will be described later with reference to FIG. 4. The physical machine group 7 will be described later with reference to FIG. 3.

Figure 3:
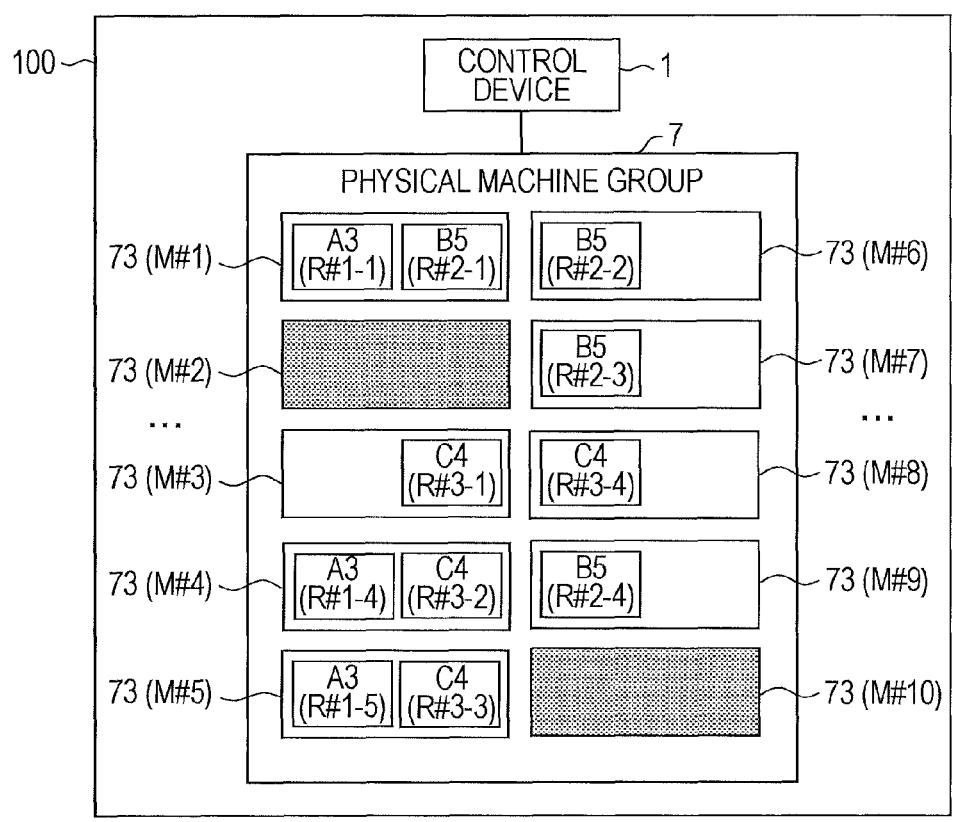
FIG. 3 is a diagram illustrating the state of an example of a physical machine group at arbitrary point-in-time of a data center according to the first embodiment.

FIG. 3 is a diagram illustrating an example of the configuration of the information processing system 1000, and is a diagram illustrating the physical machine group 7.

The physical machine group 7 includes multiple physical machines 73. With the physical machine group 7, upon an assignment request being input, a virtual machine is arranged on the multiple physical machines 73 in response to the assignment request. Note that FIG. 3 is a diagram illustrating an example of the state of the physical machine group 7 at a certain point-in-time of the data center 100. The number of physical machines 73 provided to the physical machine group 7 may optionally be set.

Note that let us assume that 10 virtual machines of which the capabilities is "1" may be arranged on one physical machine 73. Note that the capability of a virtual machine may also be set to "2", or the operation director of the data center 100 may also determine this as to the user beforehand. Also, the capability of a virtual machine may be determined using a parameter for determining a capability other than the number of clocks of the CPU, and the capacity of the main memory. For example, the number of CPUs (cores), a band in communication, the capacity of the hard disk, access speed as to the hard disk, or the like may be used, and a combination of the above parameters may also be used.

Also, two or more capability units of a virtual machine that may be specified in a resource assignment request may be prepared. With the first embodiment and a later-described second embodiment, the capability units of a virtual machine that may be specified in a resource assignment request are three types of "3", "4", and "5".

The capability of a virtual machine may be specified along with the number of virtual machines in a resource assignment request. The user may request the physical machine group 7 from assignment, for example, such that three redundancies for a virtual machine with the probability "3", four redundancies for a virtual machine with the probability "5", and four redundancies for a virtual machine with the probability "4". In this case, based on the capability and redundancies of a virtual machine specified in the resource assignment request, a virtual machine is arranged on the multiple physical machines 73.

For example, in FIG. 3, the virtual machines with management IDs "R#1-1" and "R#2-1" are arranged on the physical machine 73 with the physical machine ID "M#1". With "A3" of the virtual machine with the management ID "R#1-1", "A" indicates a resource ID, and "3" indicates a later-described capability. The virtual machines with management IDs "R#1-1", "R#1-4", and "R#1-5" are the same resource, and corresponds to the virtual machine request ID "R#1". Note that "R#1-2" and "R#1-3" are not included in FIG. 3, which indicates that the virtual machines with management IDs "R#1-2" and "R#1-3" have been deleted by a deletion request by this point in time. The virtual machines with other management IDs are also arranged on the physical machine 73 in the same way.

Note that, in FIG. 3, physical machines 73 to which power is applied, and physical machines 73 to which no power is applied, are identified by hatching. Physical machines 73 to which power are applied are indicated with a rectangle having no hatching. In FIG. 3, physical machines 73 to which power is applied are the physical machine 73 with physical machine ID "M#1" and the physical machines 73 with physical machine IDs "M#3" through "M#9". On the other hand, physical machines 73 to which no power are applied are indicated by hatching. In FIG. 3, physical machines 73 to which no power is applied are the physical machine 73 with physical machine ID "M#2" and the physical machine 73 with physical machine ID "M#10" where no virtual machine is arranged. The powers of the physical machines 73 with physical IDs "M#2" and "M#10" where no virtual machine is arranged is powered off, whereby power that the data center 100 consumes may be conserved.

Figure 4:
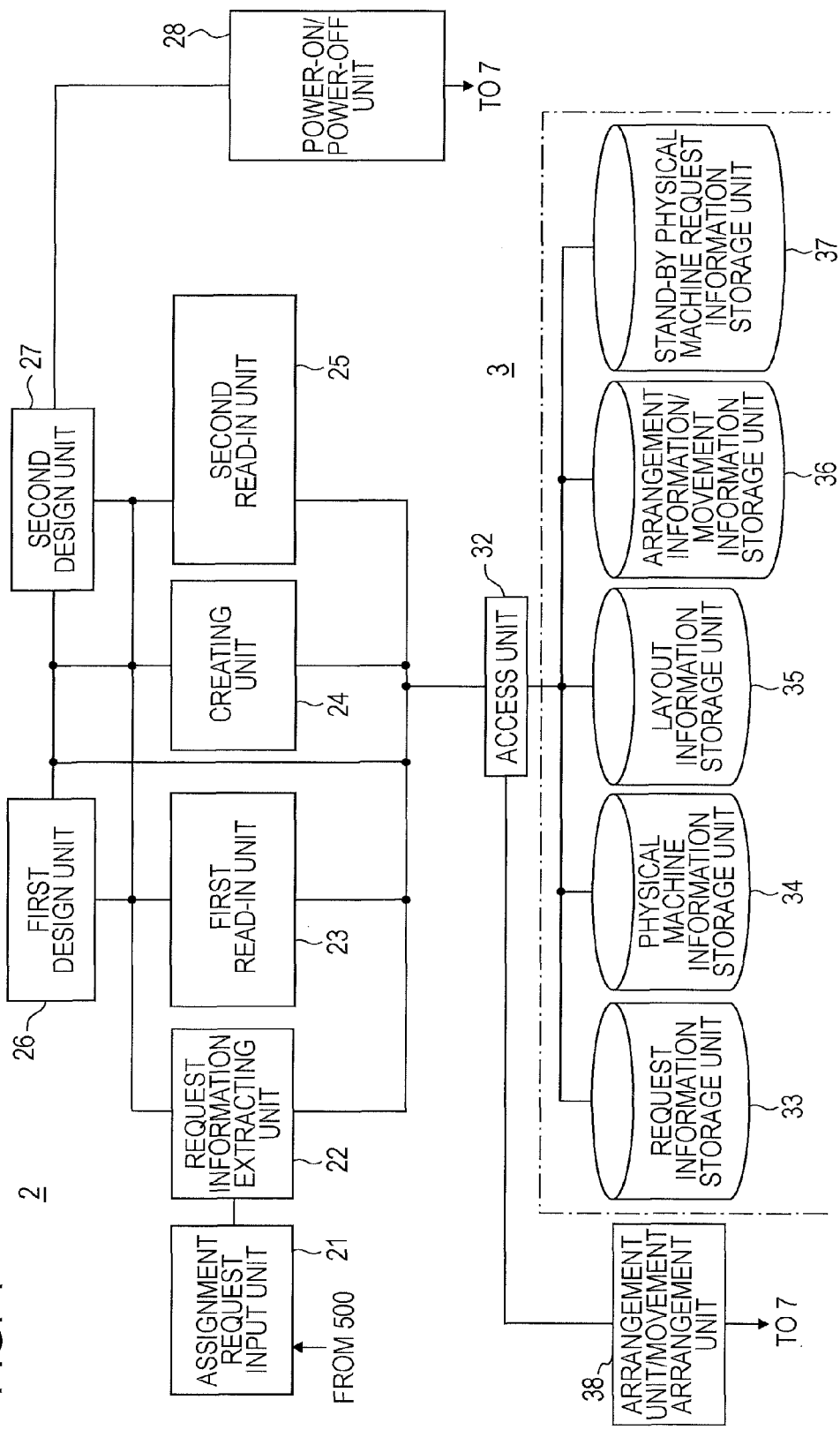
FIG. 4 is a diagram illustrating an example of the function block diagram of the information processing system according to the first embodiment.

FIG. 4 is a diagram illustrating an example of the configuration of the information processing system 1000, and is a diagram regarding the control device 1.

With the control device 1, the arrangement processing unit 2 receives the virtual machine assignment request input from the resource request terminal 500. The arrangement processing unit 2 creates request information based on the input virtual machine assignment request. The arrangement processing unit 2 performs layout design for laying out the assign-requested virtual machine on the physical machines 73 of the physical machine group 7 based on the request information and physical machine information. The arrangement processing unit 2 creates arrangement information based on the virtual machine layout information. The virtual machine layout information indicates that how many virtual machines are deployed in the physical machines 73. In the event that a virtual machine movement condition is satisfied, the arrangement processing unit 2 performs re-layout design for moving a virtual machine on a physical machine 73 onto another physical machine 73. The arrangement processing unit 2 creates movement information based on the re-layout design. The arrangement processing unit 2 may change a deployment of a virtual machine.

Specifically, the arrangement processing unit 2 determines a virtual machine layout in the physical machine group 7, creates layout design information for arrangement and movement of a virtual machine, and performs arrangement control of a virtual machine as to the physical machine group 7 by the arrangement unit/movement arrangement unit 38. Note that the arrangement processing unit 2 writes the created arrangement design information in the corresponding data base of the data management unit 3.

In the event that the power condition of the physical machines 73 is satisfied, the arrangement processing unit 2 performs power-on/power-off of the physical machines 73. In other words, during application of power, in the event that when of M (M is an integer equal to or greater than 1) physical machines 73 on each of which at least one virtual machine is laid out, the number of physical machines 73 of which the remaining capabilities are equal to or greater than a predetermined capability is less than a predetermined number, if determination is made that change may be performed wherein the virtual machines arranged on the M physical machines 73 are laid out on the M−1 or less (P) physical machines 73, the control device 1 executes this change. At this time, before execution of the change, in the event that power is being applied to the M physical machines, application of power to one or more physical machines of the M physical machines is released according to execution of the change, and consequently, power is being applied to the M−1 or less (P) physical machines. Thus, one or more physical machines may be released, and further, power consumption may also be reduced by release of application of power.

Also, with regard to change wherein when of M physical machines on each of which at least one virtual machine is laid out, the number of physical machines of which the remaining capabilities are equal to or greater than a predetermined capability is less than a predetermined number by N, the virtual machines laid out on the M physical machines are laid out on the M+N−1 or less (Q) physical machines, in the event that after this change, determination is made that change may be performed wherein of the M+N−1 or less (Q) physical machines, the number of physical machines of which the remaining capabilities are equal to or greater than the predetermined capability reaches the predetermined number, the arrangement processing unit 2 executes this change. At this time, before execution of the change, power is being applied to the M+N physical machines, and according to execution of the change, application of power to one or more physical machines of the M+N physical machines is released, and consequently, power is being applied to the M+N−1 or less (Q) physical machines. Thus, one or more physical machines may be released, and further, power consumption may also be reduced by release of application of power.

The arrangement processing unit 2 includes an assignment request input unit 21, a request information extracting unit 22, a first read-in unit 23, a creating unit 24, a second read-in unit 25, a first design unit 26, a second design unit 27, a power-on/power-off unit 28, an access unit 32, and an arrangement unit/movement arrangement unit 38.

The assignment request input unit 21 receives the virtual machine assignment request input from the resource request terminal 500. The assignment request input unit 21 transmits the received virtual machine assignment request to the request information extracting unit 22.

The request information extracting unit 22 extracts request information from the assignment request. The request information extracting unit 22 writes the request information in a request information storage unit 33 via the access unit 32. The request information extracting unit 22 transmits the request information to the first design unit 26.

The first read-in unit 23 reads in physical machine information from a physical machine information storage unit 34. The first read-in unit 23 reads in virtual machine existing layout design information from a layout information storage unit 35. The layout information storage unit 35 stores the virtual machine information indicating that how many virtual machines are deployed in the physical machines 73. The first read-in unit 23 transmits the read physical machine information and virtual machine existing layout design information to the first design unit 26.

The creating unit 24 creates arrangement information and movement information based on difference information of the new layout design information received from the first design unit 26. The creating unit 24 writes the created arrangement information and movement information in an arrangement information/movement information storage unit 36. The creating unit 24 creates movement information based on the difference information of the re-raid out new layout design information received from the second design unit 27. The creating unit 24 writes the created movement information in the arrangement information/movement information storage unit 36.

The second read-in unit 25 reads in entire resource request information from the request information storage unit 33. The second read-in unit 25 reads in physical machine information from the physical machine information storage unit 34. The second read-in unit 25 reads in layout information from the layout information storage unit 35. The second read-in unit 25 reads in stand-by physical machine request information from the stand-by physical machine request information storage unit 37. The second read-in unit 25 transmits the read request information, physical machine information, layout information, and stand-by physical machine request information to the second design unit 27.

Upon receiving the request information from the request information extracting unit 22, the first design unit 26 reads in the physical machine information and existing layout design information from the first read-in unit 23. The first design unit 26 performs virtual machine layout design based on the read physical machine information, existing layout design information, and request information to create new layout design information. Note that the new layout design information includes difference information between the existing layout design information and the request information. Also, in the event of changing the power states of one or more physical machines 73 of the physical machine information from power-off to power-on at the time of creating new layout design information, the one or more physical machine IDs to which power is applied are informed to the power-on/power-off unit 28. In the event of changing this physical machine information, the first design unit 26 writes the created new physical machine information in the physical machine information storage unit 34 of the data management unit 3 via the access unit 32 of the data management unit 3. The first design unit 26 transmits the created new layout design information to the creating unit 24 of the arrangement processing unit 2. The first design unit 26 writes the created new layout design information in the layout information storage unit 35 of the data management unit 3 via the access unit 32. The first design unit 26 employs a layout algorithm to lay out a virtual machine in the physical machine group 7. Layout design is performed by using a layout algorithm, for example, such as a bottle packing algorithm, a knapsack problem solution algorithm, or the like and also using a restraint condition and so forth.

The first design unit 26 creates layout design information wherein the virtual machines with redundant management IDs "R#1-1" through "R#1-5" are not laid out on the same physical machine 73 but on different physical machines 73 respectively. At the time of failure occurring at one physical machine 73, it is desirable to continuously provide a service to the user using a virtual machine laid out on another physical machine 73.

The second design unit 27 creates layout design information where virtual machines are re-laid out based on the request information, physical machine information, existing layout design information, and stand-by physical machine request information, read in from the second read-in unit 25. Note that the created layout design information includes difference information as to the existing layout design information. The second design unit 27 transmits the created layout design information to the creating unit 24 of the arrangement processing unit 2. The second design unit 27 writes and stores the created layout design information in the layout information storage unit 35 of the data management unit 3 via the access unit 32 of the data management unit 3. The second design unit 27 creates layout design information used for re-layout of a virtual machine in accordance with the following procedure.

The second design unit 27 obtains the remaining capability of each of the multiple physical machines 73 during power-on. The second design unit 27 determines physical machines 73 of which the remaining capabilities are equal to or greater than the stand-by physical machine request capability of the stand-by physical machine request information, from the remaining capability of each of the obtained physical machines 73. After determination, the second design unit 27 obtains the total number of physical machines 73 of which the remaining capabilities are equal to or greater than the stand-by physical machine request capability of the stand-by physical machine request information. In the event that the total number of physical machines 73 is smaller than the stand-by physical machine request count, the second design unit 27 selects one physical machine 73 where multiple virtual machines are arranged, out of the physical machines 73 of which the remaining capabilities are smaller than the stand-by physical machine request capability. The second design unit 27 selects a virtual machine to be moved, out of multiple virtual machines arranged on the selected individual physical machines 73 so that the remaining capabilities of the selected individual physical machines 73 become equal to or greater than the stand-by physical machine request capability.

Note that, with the information processing system 1000 according to the first embodiment, information obtained from the maximum value of the request capability of a virtual machine that may be specified, the mean virtual machine count per user, and a stand-by physical machine request count obtained from an offset number a is taken as stand-by physical machine request information. An example of the stand-by physical machine request information in the information processing system 1000 according to the first embodiment is as follows.

The stand-by physical machine request information is obtained by using the maximum request capability of a virtual machine that may be specified and (mean virtual machine count per user+offset number α).

In the event that the remaining capabilities of the physical machines 73 of the physical machine group 7 are found to be insufficient based on the stand-by physical machine request information, the second design unit 27 creates the layout design information of a virtual machine to be re-laid out so as not to lay out a virtual machine to be moved on the same physical machine 73. The arrangement unit/movement arrangement unit 38 moves a virtual machine on the physical machines 73 based on the layout design information created by the second design unit 27, whereby layout design information satisfying the stand-by physical machine request information may be created. The virtual machine layout design information thus created will be referred to as re-laid layout design information.

The maximum request ability of a request virtual machine that may be specified according to the first embodiment is "5". The mean virtual machine count per user according to the first embodiment is "4" that is the mean virtual machine count of the virtual machines with the management IDs shown in FIG. 5A. The offset number a according to the first embodiment is set to "1"

As for the stand-by physical machine request information according to the first embodiment, with the information processing system 1000, it is desirable that in response to request information from the user wherein the maximum "5" virtual machines having the maximum request capability "5" are arranged, the virtual machines may be arranged on the physical machines 73. Specifically, in order that the information processing system 1000 according to the first embodiment satisfies the stand-by physical machine request information, it is desirable that the number of multiple physical machines 73 of which the remaining capabilities are equal to or greater than "5 (predetermined number)", on which a virtual machine is laid out. Note that the numeric values set to the stand-by physical machine request information may be changed as appropriate.

Note that it is desirable to obtain the mean virtual machine count by deploying a process for obtaining from the average of virtual machine arrangement request count include in the arrangement request. The process for obtaining the average of the virtual machine arrangement request count is deployed, whereby suitable stand-by physical machine request information may be provided as appropriate even when the virtual machine arrangement request count varies.

The second design unit 27 determines the IDs and number of physical machines 73 which will be powered on or off based on the layout design information of the physical machines 73 where a virtual machine has been laid out. The second design unit 27 transmits the IDs and number of the physical machines 73 which will be powered on or off to the power-on/power-off unit 28. In the event of powering on or off, the second design unit 27 changes the physical machine information, and writes in the physical machine information storage unit 34 of the data management unit 3 via the access unit 32 of the data management unit 3.

The power-on/power-off unit 28 performs power-on or power-off of the physical machines 73 based on the IDs and number of the physical machines 73 which will be powered on or off received form the second design unit 27.

The access unit 32 of the data management unit 3 reads in or writes information specified from the first read-in unit 23, creating unit 24, second read-in unit 25, first design unit 26, second design unit 27, and arrangement unit/movement arrangement unit 38 as to the request information storage unit 33 corresponding to the specification, physical machine information storage unit 34, layout information storage unit 35, arrangement information/movement information storage unit 36, and stand-by physical machine request information storage unit 37.

The arrangement unit/movement arrangement unit 38 arranges a virtual machine on the physical machines 73 of the physical machine group 7 based on the arrangement information of the arrangement information/movement information storage unit 36. The arrangement unit/movement arrangement unit 38 moves a virtual machine onto the physical machines 73 based on the movement information of the arrangement information/movement information storage unit 36. On the other hand, the arrangement unit/movement arrangement unit 38 deletes a virtual machine from the physical machines 73 of the physical machine group 7 based on the movement information of the arrangement information/movement information storage unit 36. After completion of arrangement, movement, and deletion of a virtual machine, the arrangement unit/movement arrangement unit 38 overwrites the related information of the virtual machine where arrangement, movement, and deletion have been completed on an unused state of the arrangement information/movement information storage unit 36, and deletes the related information of the virtual machine where arrangement, movement, and deletion have been completed.

The data management unit 3 performs processing for storing the request information, arrangement information, and movement information, which the arrangement processing unit 2 created, physical machine information, stand-by physical machine request information, and layout design information, which are prepared beforehand.

Also, the data management unit 3 actually arranges a virtual machine on the physical machines 73 of the physical machine group 7 as shown in FIG. 3 described earlier, based on the arrangement information created from the request information, physical machine information, and existing layout design information. The data management unit 3 actually moves a virtual machine on the physical machines 73 based on the movement information created from the request information, physical machine information, layout design information, and stand-by physical machine information.

The data management unit 3 includes the request information storage unit 33, physical machine information storage unit 34, layout information storage unit 35, arrangement information/movement information storage unit 36, and stand-by physical machine information storage unit 37.

FIG. 5A is a diagram illustrating an example of request information to be stored in the request information storage unit 33 and request information storage unit 33.

The request information storage unit 33 stores a plurality of request information, for example, in an order where request information has been input. The request information is appended with the request ID of a virtual machine in the order where request information has been input. The request ID of a virtual machine is an identification number uniquely determined in the information processing system 1000.

One piece of identification information includes a resource ID, quantity, capability, and management ID for each virtual machine request ID. The resource ID may be a user name that has input the request information. The quantity is the number of virtual machines requested with reference to the request information. The capability is the capability of a virtual machine requested with reference to the request information. The management ID is appended to each of the virtual machines request with reference to the request information. Each of the virtual machines is managed by a management ID. The management ID is an identification number uniquely determined in the information processing system 1000.

For example, upon the request information of B that is an arbitrary resource ID being input from the resource request terminal 500, the request information is appended with the request ID "R#2" of a virtual machine, and the contents of the request information are extracted. As for the request information, extraction is made wherein the resource ID is "B", the quantity is "4", and the capability is "5". Based on the extracted quantity "4", management IDs "R#2-1" through "R#2-4" are appended to the virtual machines, respectively.

Note that information other than the above may be stored in the request information storage unit 33 as request information. For example, point-in-time when request information is received by the control device 1 may be stored.

FIG. 5B is a diagram illustrating the request information storage unit 33 of the information processing system according to the first embodiment, and an example of the capabilities of a virtual machine and a physical machine to be stored in the request information storage unit 33.

As described above, the operation director of the data center 100 may determine the capability of a virtual machine that may be specified by a resource assignment request as to the user beforehand, and multiple capabilities may be prepared. As shown in FIG. 5B, with the first embodiment and a later-described second embodiment, the CPU frequencies of the physical machines 73 are set to 10.0 GHz. The memory capacities of the physical machines 73 are set to 17.0 GB. The CPU frequencies of virtual machines with the resource IDs of "A" are set to 3.0 GHz. The memory capacities of the resource IDs of "A" are set to 5.1 GB. The CPU frequencies of virtual machines with the resource IDs of "B" are set to 4.0 GHz. The memory capacities of the resource IDs of "B" are set to 6.8 GB. The CPU frequencies of virtual machines with the resource IDs of "C" are set to 5.0 GHz. The memory capacities of the resource IDs of "C" are set to 8.5 GB.

FIG. 6A is a diagram illustrating the physical machine information storage unit 34, and an example of physical machine information to be stored in the physical machine information storage unit 34.

The physical machine information storage unit 34 stores a plurality of physical machine information. One physical machine 73 is appended with a physical machine ID in an order where the physical machines 73 have been installed, for example. The physical machine ID is an identification number uniquely determined in the information processing system 1000. With this example, 10 physical machines 73 installed in the physical machine group 7 are assigned with physical machine IDs "M#1" through "M#10".

One piece of physical machine information includes the state and capability of a physical machine 73 for each physical machine ID. The state is the state of a physical machine 73, e.g., indicates the state of power.

Note that as for the state, various states other than the state of power may be stored. For example, information indicating that a physical machine 73 is out of order, that a physical machine 73 is in a stand-by state, or the like may be stored. In the event that a physical machine 73 is out of order, no virtual machine is arranged on the failed physical machine 73. Also, a physical machine 73 to which power are applied of the physical machine group 7 is normally set to a stand-by state.

FIG. 6B is a diagram illustrating the physical machine information storage unit 34, and an example of physical machine information to be stored in the physical machine information storage unit 34. Note that, in FIG. 6B, the same configurations described in FIG. 6A are denoted with the same reference numerals, and description thereof will be omitted.

In FIG. 6B, the second design unit 27 of the control device 1 selects the physical machine 73 with physical machine ID "M#6" serving as a temporary arrangement destination of a virtual machine to be moved. The state of the selected physical machine ID "M#6" is taken as "temporary power-on". "temporary power-on" indicates that the state in which the power of the selected physical machine ID "M#6" is powered on is simulated.

FIG. 6C is a diagram illustrating the physical machine information storage unit 34, and an example of physical machine information to be stored in the physical machine information storage unit 34. Note that, in FIG. 6C, the same configurations described in FIG. 6A and FIG. 6B are denoted with the same reference numerals, and description thereof will be omitted.

In FIG. 6C, the second design unit 27 selects the physical machine 73 with physical machine ID "M#7" serving as a temporary arrangement destination of a virtual machine to be moved. The state of the physical machine 73 with the selected physical machine ID "M#7" is taken as "temporary power-on".

FIG. 7A is a diagram illustrating the layout information storage unit 35, and an example of layout design information to be stored in the layout information storage unit 35.

The layout information storage unit 35 stores the latest layout design information. The layout design information includes the use information, difference information, and remaining capability of the physical machine 73 for each physical machine ID. The use information indicates a management ID assigned to the physical machine 73 with the latest physical machine ID. The difference information indicates information obtained by updating the use information by the latest design. The remaining capability is the number of capabilities not assigned to the management ID in the physical machine 73 with the physical machine ID. With the first embodiment, the number of virtual machines which one physical machine 73 may arrange is 10, and in a state in which no virtual machine is assigned, the physical machine remaining capability is "10".

In FIG. 7A, on the physical machine 73 with the physical machine ID "M#1", the virtual machine with capability "3" of management ID "R#1-1", and the virtual machine with capability "5" of management ID "R#2-1" are arranged. The remaining capability of the physical machine 73 with the physical machine ID "M#1" in this case is "2".

Also, after the virtual machine with management ID "R#1-3" is arranged on the physical machine 73 with physical machine ID "M#3", in the event that the first design unit 26 newly performs layout design of the virtual machine with management ID "R#3-1" as to the physical machine 73 with physical machine ID "M#3", the use information is updated to "R#1-3, R#3-1". Also, the difference information becomes "R#3-1 added" as information updated from the use information, and at this point-in-time the remaining capability becomes "3".

FIG. 7B is a diagram illustrating the layout information storage unit 35, and an example of layout design information to be stored in the layout information storage unit 35. Note that, in FIG. 7B, the same configurations described in FIG. 7A are denoted with the same reference numerals, and description thereof will be omitted.

In FIG. 7B, on the physical machine 73 with the physical machine ID "M#1", the virtual machine with capability "3" of management ID "R#1-1" is arranged. The remaining capability of the physical machine 73 with the physical machine ID "M#1" in this case is "7". Also, the difference information becomes "R#1-1 added" as information updated from the use information, and at this point-in-time the remaining capability of the physical machine 73 with physical machine ID "M#1" becomes "7".

FIG. 7C is a diagram illustrating the layout information storage unit 35, and an example of layout design information to be stored in the layout information storage unit 35. Note that, in FIG. 7C, the same configurations described in FIGS. 7A and 7B are denoted with the same reference numerals, and description thereof will be omitted.

In FIG. 7C, on the physical machine 73 with the physical machine ID "M#4", after the virtual machine with management ID "R#1-4" is arranged, in the event that the first design unit 26 newly takes out the virtual machine with management ID "R#2-4" as to the physical machine 73 with physical machine ID "M#4", and temporarily moves to the physical machine 73 with physical machine ID "M#6", the use information is updated to "R#1-4". The difference information becomes "R#2-4 temporary movement: out" as information updated from the use information. "temporary movement" indicates that the first design unit 26 simulates a state in which the virtual machine with management ID "R#2-4" is moved from the physical machine 73 with physical machine ID "M#4". At this point-in-time the remaining capability of the physical machine 73 with physical machine ID "M#4" becomes "temporary 7". "temporary 7" indicates that the first design unit 26 simulates a state in which the virtual machine with management ID "R#2-4" is moved from the selected physical machine 73 with physical machine ID "M#4".

Also, on the physical machine 73 with the physical machine ID "M#6", in the event that the first design unit 26 temporarily moves the virtual machine with management ID "R#2-4" from the physical machine 73 with physical machine ID "M#4" into the physical machine 73 with physical machine ID "M#6", the use information is updated to "temporary R#2-4". The difference information becomes "R#2-4 temporary movement: in" as information updated from the use information. At this point-in-time the remaining capability of the physical machine 73 with physical machine ID "M#6" becomes "temporary 5". "temporary 5" indicates that the first design unit 26 simulates a state in which the virtual machine with management ID "R#2-4" is moved to the selected physical machine 73 with physical machine ID "M#6".

FIG. 7D is a diagram illustrating the layout information storage unit 35, and an example of layout design information to be stored in the layout information storage unit 35. Note that, in FIG. 7D, the same configurations described in FIG. 7A through FIG. 7C are denoted with the same reference numerals, and description thereof will be omitted.

In FIG. 7D, on the physical machine 73 with the physical machine ID "M#3", after the virtual machine with management ID "R#1-3" is arranged, in the event that the first design unit 26 newly takes out the virtual machine with management ID "R#2-3" as to the physical machine 73 with physical machine ID "M#3", and temporarily moves to the physical machine 73 with physical machine ID "M#7", the use information is updated to "R#1-3". The difference information becomes "R#2-3 temporary movement: out" as information updated from the use information. At this point-in-time the remaining capability of the physical machine 73 with physical machine ID "M#3" becomes "temporary 7". "temporary 7" indicates that the first design unit 26 simulates a state in which the virtual machine with management ID "R#2-3" is moved from the selected physical machine 73 with physical machine ID "M#3".

Also, on the physical machine 73 with the physical machine ID "M#7", in the event that the first design unit 26 temporarily moves the virtual machine with management ID "R#2-3" from the physical machine 73 with physical machine ID "M#3" into the physical machine 73 with physical machine ID "M#7", the use information is updated to "temporary R#2-3". The difference information becomes "R#2-3 temporary movement: in" as information updated from the use information. At this point-in-time the remaining capability of the physical machine 73 with physical machine ID "M#7" becomes "temporary 5". This "temporary 5" indicates that the first design unit 26 simulates a state in which the virtual machine with management ID "R#2-3" is moved into the selected physical machine 73 with physical machine ID "M#7".

FIG. 8A is a diagram illustrating the arrangement information/movement information storage unit 36, and an example of movement information to be stored in the arrangement information/movement information storage unit 36.

The arrangement information/movement information storage unit 36 stores the arrangement information and movement information of multiple virtual machines. The arrangement information and movement information of a virtual machine include a request ID, a movement source, and a movement destination for each management ID. The movement source indicates a physical machine 73 where the virtual machine with the management ID is currently arranged. However, in the event that a virtual machine with management ID is newly arranged, the movement source becomes "none". The movement destination indicates the physical machine 73 where the virtual machine with management ID has to be arranged or moved. The movement information of the multiple virtual machines shown in FIG. 8A indicates that the four virtual machines with management IDs "R#3-1" through "R#3-4" of the request ID "R#3" are arranged on the physical machines 73 "M#3" through "M#6" respectively according to new arrangement.

FIG. 8B is a diagram illustrating the arrangement information/movement information storage unit 36, and an example of virtual machine movement information to be stored in the arrangement information/movement information storage unit 36. Note that, in FIG. 8B, the same configurations described in FIG. 8A are denoted with the same reference numerals, and description thereof will be omitted.

The virtual machine movement information shown in FIG. 8B indicates that the virtual machine with management ID "R#3-4" is moved from the physical machine 73 with physical machine ID "M#6" into the physical machine 73 with physical machine ID "M#8".

FIG. 8C is a diagram illustrating the arrangement information/movement information storage unit 36, and an example of virtual machine movement information to be stored in the arrangement information/movement information storage unit 36. Note that, in FIG. 8C, the same configurations described in FIG. 8A and FIG. 8B are denoted with the same reference numerals, and description thereof will be omitted.

FIG. 8C illustrates an example of movement information representing virtual machine deletion. In the event of movement information representing deletion, the movement destination of the physical machine 73 is set to "none". The movement information of the multiple virtual machines shown in FIG. 8C indicates that the virtual machines with management IDs "R#1-2" and "R#1-3" will be deleted.

FIG. 8D is a diagram illustrating the arrangement information/movement information storage unit 36, and an example of virtual machine movement information to be stored in the arrangement information/movement information storage unit 36. Note that, in FIG. 8D, the same configurations described in FIG. 8A through FIG. 8C are denoted with the same reference numerals, and description thereof will be omitted.

The movement information of the multiple virtual machines shown in FIG. 8D indicates that the virtual machine with management ID "R#2-4" is temporarily moved from the physical machine 73 with physical machine ID "M#4" into the physical machine 73 with physical machine ID "M#6".

FIG. 8E is a diagram illustrating the arrangement information/movement information storage unit 36, and an example of virtual machine movement information to be stored in the arrangement information/movement information storage unit 36. Note that, in FIG. 8E, the same configurations described in FIG. 8A through FIG. 8D are denoted with the same reference numerals, and description thereof will be omitted.

The movement information of the multiple virtual machines shown in FIG. 8E indicates that the virtual machine with management ID "R#2-4" is temporarily moved from the physical machine 73 with physical machine ID "M#4" into the physical machine 73 with physical machine ID "M#6", and simultaneously indicates that the virtual machine with management ID "R#2-3" is temporarily moved from the physical machine 73 with physical machine ID "M#3" into the physical machine 73 with physical machine ID "M#7".

Note that the arrangement information and movement information according to FIG. 8A through FIG. 8E are deleted after completion of the arrangement and movement of a virtual machine. Note that the arrangement information and movement information may be overwritten on an used state after the arrangement and movement of a virtual machine. Also, the arrangement information and movement information may be overwritten at the time of storing the next arrangement information and movement information. Also, the new arrangement information and movement information may be added while managing arrangement and movement completion states as appropriate.

Note that the arrangement information/movement information storage unit 36 may store information other than a movement source or the like as arrangement information and movement information. For example, point-in-time when request information regarding a virtual machine to be arranged and moved is received by the control device 1, arrangement point-in-time, movement point-in-time, a virtual machine to be arranged, the capability of a virtual machine to be moved, or the like may be stored.

Figure 9:
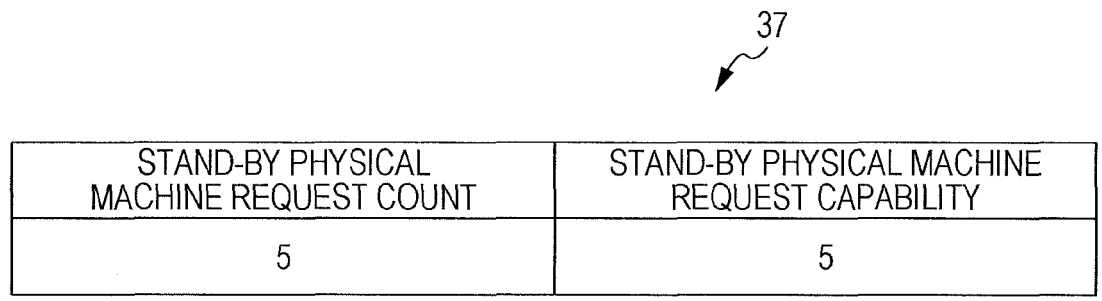
FIG. 9 is a diagram illustrating an example of a stand-by physical machine request information storage unit according to the first embodiment, and stand-by physical machine request information to be stored in the stand-by physical machine request information storage unit.

FIG. 9 is a diagram illustrating the stand-by physical machine request information storage unit 37, and an example of stand-by physical machine request information to be stored in the stand-by physical machine request information storage unit 37.

The stand-by physical machine request information storage unit 37 stores stand-by physical machine request count and stand-by physical machine request capability. The stand-by physical machine request count and stand-by physical machine request capability are set by the operation director of the data center 100. The stand-by physical machine request count and stand-by physical machine request capability may be set arbitrary values. Also, the stand-by physical machine request count and stand-by physical machine request capability may be changed as appropriate. The stand-by physical machine request capability according to the first embodiment is set to "5" that is the maximum request capability that may be specified by a resource assignment request. The stand-by physical machine request count is set to "5" obtained by adding "1" that is an offset number to "4" that is the mean virtual machine count per user according to the first embodiment. The stand-by physical machine request information storage unit 37 of the control device 1 obtains the mean virtual machine count that is a predetermined number from the average of the virtual machine assignment request count included in an assignment request.

Figure 10A:
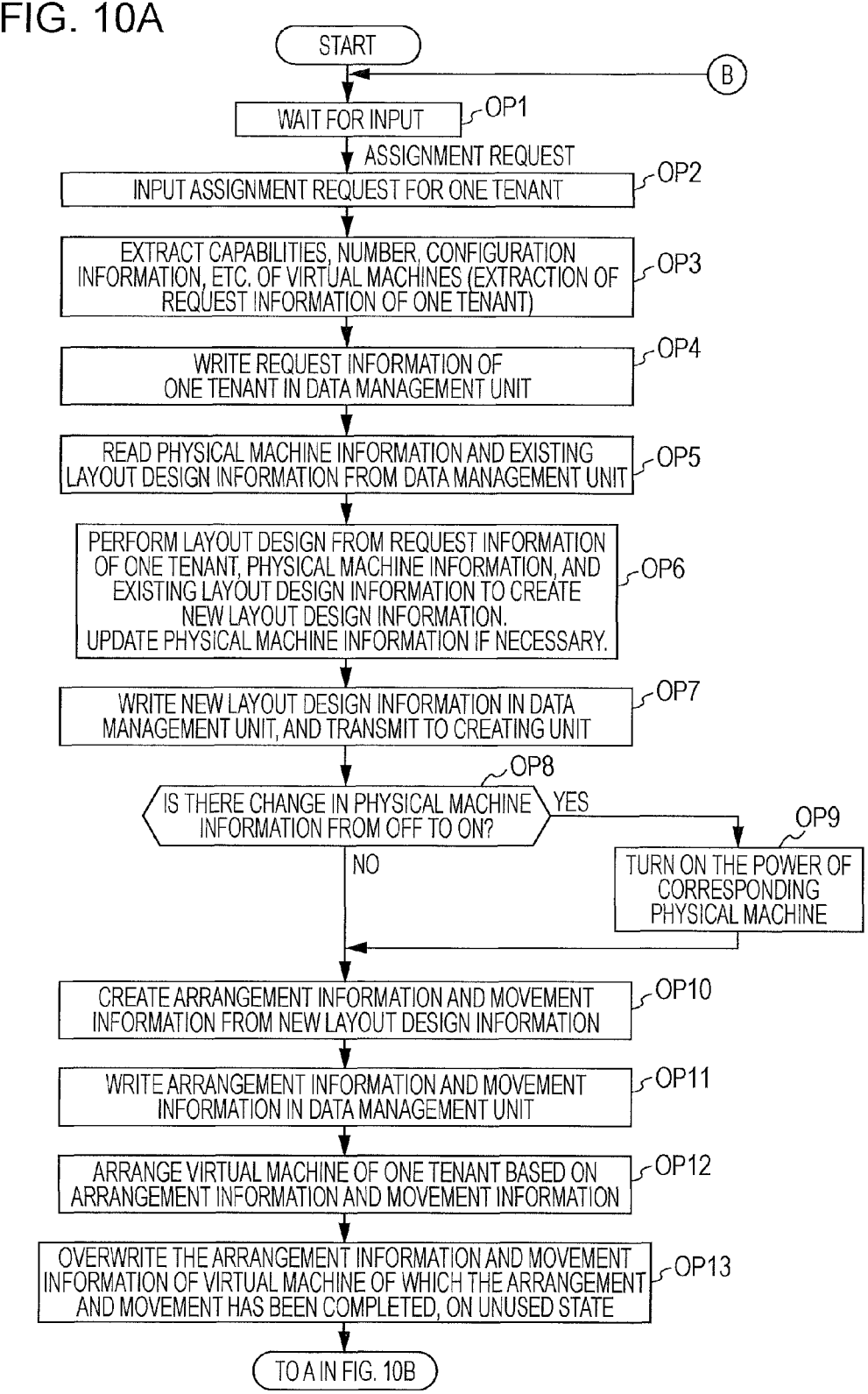
FIG. 10A is a flowchart of virtual machine arrangement processing that the information processing system according to the first embodiment executes.
Figure 10B:
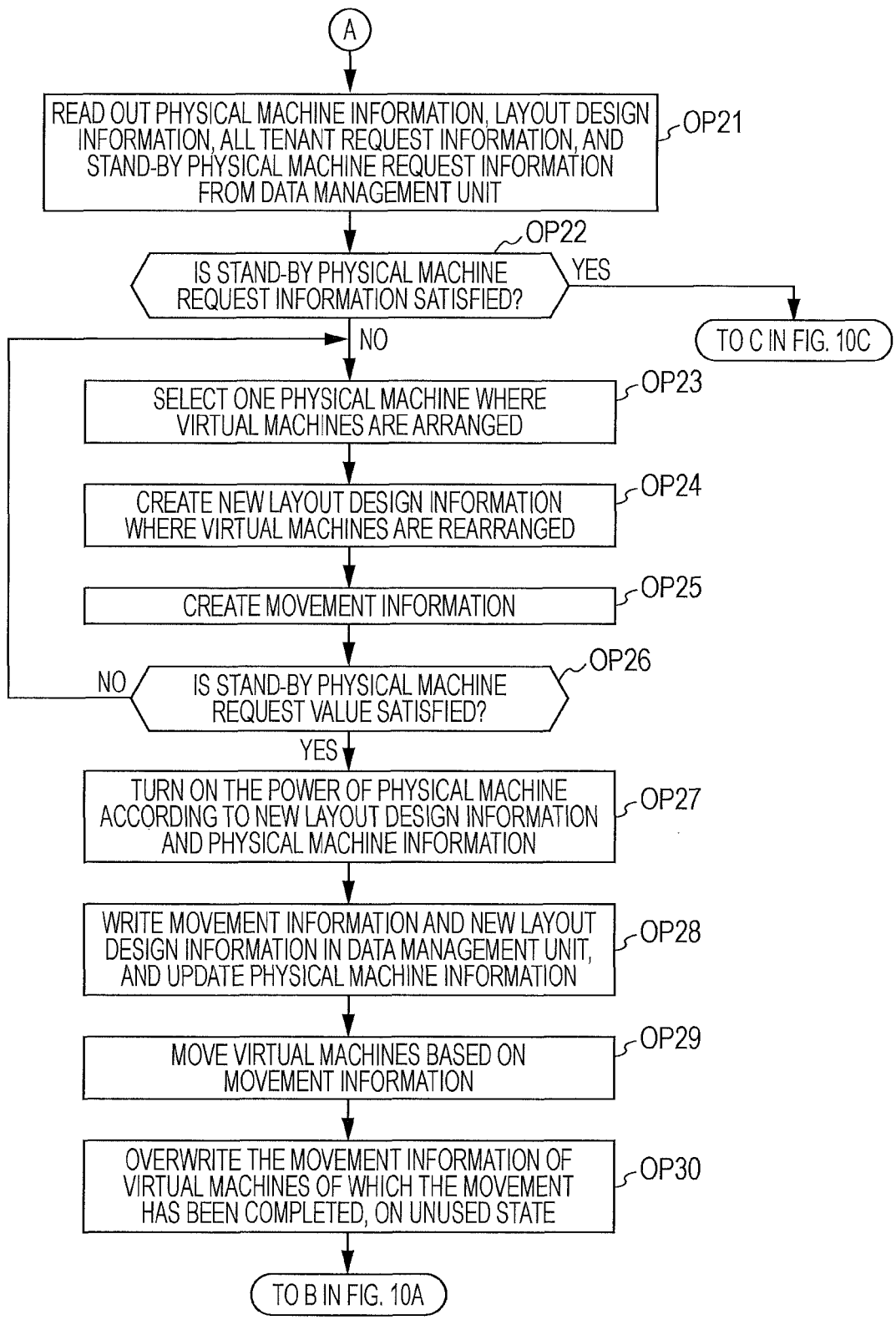
FIG. 10B is a flowchart of virtual machine arrangement processing that the information processing system according to the first embodiment executes.
Figure 10C:
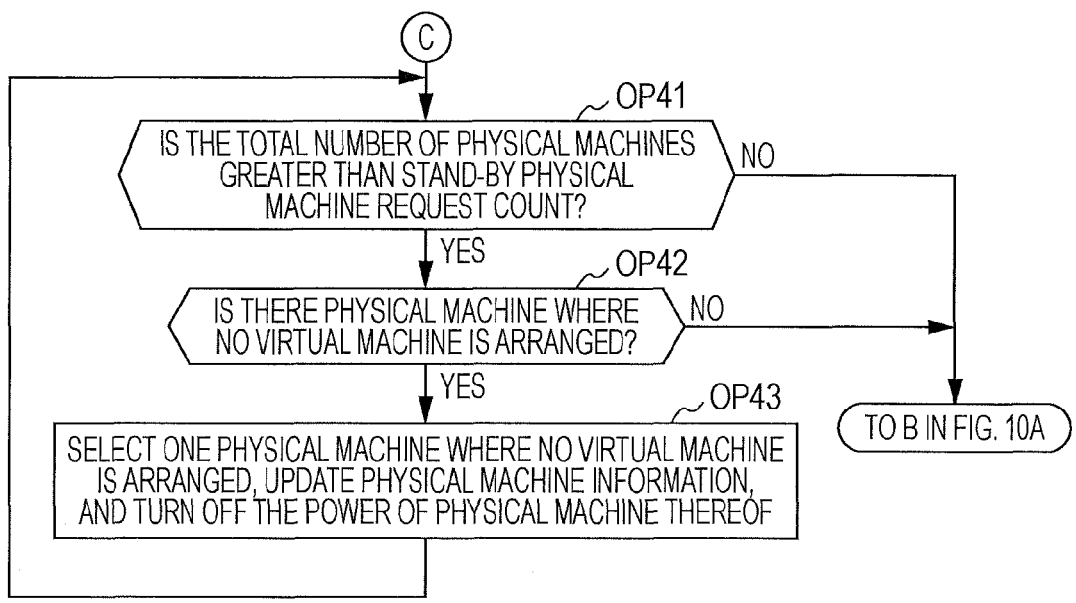
FIG. 10C is a flowchart of virtual machine arrangement processing that the information processing system according to the first embodiment executes.

FIG. 10A, FIG. 10B, and FIG. 10C are diagrams illustrating the flowchart of virtual machine arrangement processing that the information processing system 1000 according to the first embodiment executes. The processing shown in FIG. 10A continues into "A" in FIG. 10B. The processing shown in FIG. 10B continues into "B" in FIG. 10A and "C" in FIG. 10C. The processing shown in FIG. 10C continues into "B" in FIG. 10A.

As shown in FIG. 10A, The assignment request input unit 21 is in a input waiting state (OP1). In this state, upon one resource assignment request being input from the resource request terminal 500 (OP2), the assignment request input unit 21 receives a virtual machine assignment request.

Next, the request information extracting unit 22 extracts request information such as the capabilities, number, configuration information, and so forth of virtual machines from the input assignment request (OP3). Next, the first read-in unit 23 writes one resource worth of extracted request information in the request information storage unit 33 (OP4).

Next, the first design unit 26 reads in physical machine information from the physical machine information storage unit 34, for example, with reception of the request information from the request information extracting unit 22 as a trigger (OP5). Further, the first design unit 26 reads in existing layout design information from the layout information storage unit 35 with reception of the request information of the request information extracting unit 22 as a trigger (OP5).

Next, the first design unit 26 performs virtual machine layout design from one resource request information, physical machine information, and existing layout information to create virtual machine new layout design information (OP6). At this time, it is desirable that the first design unit 26 obtains a predetermined number of the physical machines 73 of which the remaining capabilities are equal to or greater than a predetermined capability from the average of the virtual machine layout request counts of M (M is an integer equal to or greater than 1). When creating new layout design information, in the event that design is performed wherein a virtual machine is laid out on a physical machine 73 where the power state of the physical machine information is off, the first design unit 26 updates the physical machine information of the physical machine information management unit 34 (OP6).

The first design unit 26 writes the new layout design information in the layout information storage unit 35, and transmits the new layout design information to the creating unit 24 (OP7).

Next, the first design unit 26 determines whether or not the power state of the physical machine information has been changed from power-off to power-on in OP6 (OP8). If there is no change (OP8: NO), the first design unit 26 performs processing in OP10.

In the event that determination is made in OP6 that the power state of the physical machine information has been changed from power-off to power-on (OP8: YES), the power-on/power-off unit 28 turns on the power of the physical machine 73 with the changed physical machine ID (OP9), and performs processing in OP10.

Next, the creating unit 24 creates virtual machine arrangement information and movement information based on the difference information of the new layout design information (OP10). The creating unit 24 writes the created virtual machine arrangement information and movement information in the arrangement information/movement information storage unit 36 (OP11). Based on the virtual machine arrangement information and movement information created from one resource assignment request, the arrangement unit/movement arrangement unit 38 arranges and moves the virtual machine on the physical machine 73 of the physical machine group 7 (OP12). After completion of arrangement of the virtual machine, the arrangement unit/movement arrangement unit 38 overwrites the arrangement information of the virtual machine of which the arrangement and movement have been completed of the arrangement information/movement information storage unit 36 on an unused state, and deletes the arrangement information of the virtual machine of which the arrangement and movement have been completed (OP13).

As shown in FIG. 10B, the second design unit 27 reads out physical machine information, layout design information, entire resource request information, and stand-by physical machine request information from the data management unit 3 (OP21). Specifically, the second design unit 27 reads out the request information of all of the resources from the request information storage unit 33 via the second read-in unit 25 (OP21). The second design unit 27 reads out physical machine information from the physical machine information storage unit 34 via the second read-in unit 25 (OP21). The second design unit 27 reads out the latest layout design information where a virtual machine is laid out on a physical machine 73 from the layout information storage unit 35 via the second read-in unit 25 (OP21). The second design unit 27 reads out stand-by physical machine request information from the stand-by physical machine request information storage unit 37 via the second read-in unit 25 (OP21).

Next, the second design unit 27 determines whether or not the physical machines 73 within the physical machine group 7 satisfy the stand-by physical machine request information (OP22). Specifically, the second design unit 27 obtains the individual remaining capabilities of multiple physical machines 73 to which power is being applied, determines physical machines 73 of which the remaining capabilities are equal to or greater than the stand-by physical machine request capability of the stand-by physical machine request information, and obtains the total number thereof. Next, the second design unit 27 determines whether or not the total number of the physical machines 73 is equal to or greater than the stand-by physical machine request count (OP22). Specifically, the second design unit 27 of the control device 1 determines whether or not change may be performed wherein of M−1 or less physical machines 73 after change, the number of physical machines 73 of which the remaining capabilities are equal or greater than a predetermined capability reaches a predetermined number.

In the event that the physical machines 73 within the physical machine group 7 do not satisfy the stand-by physical machine request information (OP22: NO), the second design unit 27 selects one physical machine 73 where multiple virtual machines are arranged, out of the physical machines 73 of which the remaining capabilities are less than the stand-by physical machine request capability (OP23). Specifically, the second design unit 27 of the control device 1 determines whether or not change may be performed wherein of M−1 or less physical machines 73, the number of physical machines 73 of which the remaining capabilities are equal or greater than a predetermined capability reaches a predetermined number, and in the event that determination is made that the change may be performed, executes this change. At this time, even when application of power to "one" physical machine 73 is completed, a virtual machine having optional timing and optional capability value may be arranged/deleted on/from the physical machine 73. Therefore, the remaining capability may be changed event when application of power to the physical machine 73 is completed. Therefore, in order to constantly minimize the number of physical machines 73 to which power is being applied, it is desirable to obtain the remaining capability of each of the physical machines 73 to which power is being applied, and to perform application of power or temporary application of power to the physical machines 73 one at a time.

Note that, a case where the physical machines 73 within the physical machine group 7 do not satisfy the stand-by physical machine request information (OP22: NO) is a case where the total number of physical machines 73 satisfying the stand-by physical machine request capability is less than the stand-by physical machine request count (OP22: NO).

On the other hand, in the event that the physical machines 73 within the physical machine group 7 satisfy the stand-by physical machine request information (OP22: YES), the second design unit 27 performs processing in OP41 shown in FIG. 10C.

Next, the second design unit 27 creates layout design information for performing re-layout regarding the virtual machines on the physical machines 73 within the physical machine group 7 (OP24). The second design unit 27 selects a virtual machine to be moved, out of the multiple virtual machines arranged on the selected physical machine 73 so that the remaining capability of the selected physical machine 73 becomes equal to or greater than the stand-by physical machine request capability, for example (OP24). The second design unit 27 selects one of the physical machines 73 to which no power is applied as the movement destination of the virtual machine to be moved, and takes this as a temporary arrangement destination. The power-on/power-off unit 28 changes the power state of the physical machine 73 with physical machine ID of the selected temporary arrangement destination using a later-described process in OP28.

Next, the creating unit 24 creates new movement information based on the physical machine 73 which is the temporary arrangement destination of the virtual machine (OP25).

Next, the second design unit 27 determines, in the same way as with OP22, whether or not the physical machines 73 within the physical machine group 7 satisfy the stand-by physical machine request information (OP26). Specifically, the second design unit 27 obtains the remaining capability of each of the physical machines 73 to which power is being applied including a temporary arrangement destination, determines physical machines 73 of which the remaining capabilities are equal to or greater than the stand-by physical machine request capability of the stand-by physical machine request information, and obtains the total number thereof. The second design unit 27 determines whether or not the obtained total number of physical machines 73 is equal to or greater than the stand-by physical machine request count (OP26).

In the event that the total number of the physical machines 73 which satisfy the request capability is less than the stand-by physical machine request count (OP26: NO), the second design unit 27 returns to the processing in OP23.

On the other hand, in the event that the total number of the physical machines which satisfy the request capability is equal to or greater than the stand-by physical machine request count (OP26: YES), the power-on/power-off unit 28 turns on the power of the physical machine 73 of the virtual arrangement destination scheduled to be powered on according to the new layout design information and physical machine information (OP27).

Next, the creating unit 24 writes the created movement information in the arrangement information/movement information storage unit 36 based on the layout design information of the rearranged virtual machine (OP28). The second design unit 27 updates the physical machine information of the physical machine information storage unit 34 via the access unit 32 (OP28).

Next, the arrangement unit/movement arrangement unit 38 moves the virtual machine onto the physical machine 73 of the physical machine group 7 based on the one resource request information, and the movement information stored in the arrangement information/movement information storage unit 36 (OP29). Specifically, the arrangement unit/movement arrangement unit 38 of the control device 1 applies power to the physical machines 73 of which the number is equivalent to the total number of virtual machines to be moved, and moves the virtual machines to be moved onto the power-applied physical machines 73 respectively.

Next, after movement of the virtual machines is completed, the arrangement unit/movement arrangement unit 38 overwrites the movement information of the virtual machines of which the movement has been completed of the arrangement information/movement information storage unit 36 on an unused state, and deletes the movement information of the virtual machines of which the movement has been completed (OP30), and then repeats the processing in OP1.

On the other hand, in the event that the stand-by physical machine request information is satisfied (OP22: YES), as shown in FIG. 10C, the second design unit 27 determines whether or not the total number of the physical machines 73 satisfying the stand-by physical machine request capability is greater than the stand-by physical machine request count (OP41). Specifically, in the event that the assignment request has been a virtual machine deletion request, the amount of capabilities not used at the physical machines 73 to which power is being applied increases as compared to before the assignment request is input, and accordingly, extra power is consumed in such a state without change. Therefore, if possible, power may not be applied to the physical machines 73 until the stand-by physical machine request information is satisfied.

In the event that the total number of the physical machines 73 satisfying the stand-by physical machine request capability is equal to or smaller than the stand-by physical machine request count (OP41: NO), the second design unit 27 repeats the processing in OP1. Specifically, the second design unit 27 of the control device 1 repeats the processing in OP1 until the number of physical machines 73 of which the remaining capabilities are equal to or greater than a predetermined capability reaches a predetermined number.

In the event that the total number of the physical machines 73 satisfying the stand-by physical machine request capability is greater than the stand-by physical machine request count (OP41: YES), the second design unit 27 determines whether or not there is a physical machine 73 where no virtual machine is arranged of the physical machines 73 satisfying the stand-by physical machine request capability (OP42). In the event that there is no physical machine 73 where no virtual machine is arranged (OP42: NO), the second design unit 27 repeats the processing in OP1. Specifically, the second design unit 27 of the control device 1 repeats the processing in OP1 until the number of physical machines 73 of which the remaining capabilities are equal to or greater than a predetermined capability becomes a predetermined number.

In the event that there is a physical machine 73 where no virtual machine is arranged (OP42: YES), the second design unit 27 selects one physical machine 73 where no virtual machine is arranged, and turns off the power of the selected physical machine 73 via the power-on/power-off unit 28 (OP43). Specifically, in the event that according to change wherein the virtual machines laid out on M physical machines 73 are laid out on M−1 or less physical machines 73, all of the virtual machines arranged on the physical machines 73 have been moved, the second design unit 27 of the control device 1 turns off the powers of the physical machines 73 where all of the virtual machines have been moved. The second design unit 27, as a changing unit, changes the deployment of a virtual machine deployed in the M physical machines to M−1 or less physical machines among the M physical machines when a number of physical machines of which remaining capabilities are equal to or greater than a predetermined capability is more than a predetermined number. The second design unit 27 updates the physical machine information of the physical machine information storage unit 34 so that the power states of the physical machine IDs of the physical machines 73 to which no power is applied become power-off. Next, the second design unit 27 returns the processing in OP41.

With the first embodiment, in the event that the stand-by physical machine request information is satisfied, determination is made using the stand-by physical machine request count obtained by referencing existing layout design information. However, there may be a case where the stand-by physical machine information is satisfied, and also virtual machines may be moved so as to provide a physical machine 73 where no virtual machine is arranged using a movement algorithm. In such a case, after new layout design information and movement information are created once, the processing in OP41 in the same way as with the embodiment may be started.

FIG. 11 through FIG. 18 are diagrams illustrating an example of resource management according to the information processing system 1000 of the first embodiment.

FIG. 11 is a diagram illustrating input of an assignment request according the information processing system 1000 of the first embodiment. As shown in FIG. 11, an assignment request is input from a resource A at point-in-time T1. The input assignment request requests "5" virtual machines of which the capacities are "3". Upon the virtual machine assignment request being input, the data center 100 immediately starts the service. Accordingly, upon the assignment request being input from the assignment request input unit 21 at the point-in-time T1, the request information extracting unit 22 of the control device 1 appends a request ID "R#1" for the virtual machines to the assignment request, and extracts request information, and stores the extracted request information in the request information storage unit 33 shown in FIG. 4. The first design unit 26 reads in the physical machine information of the physical machine information storage unit 34, and the existing layout information of the layout information storage unit 35 via the first read-in unit 23 to design new layout design information. The arrangement unit/movement arrangement unit 38 of the control device 1 lays out the virtual machines corresponding to the assignment request of R#1 on the physical machines 73 of the physical machine group 7 based on the arrangement information created at the creating unit 24 based on the new layout design information designed at the first design unit 26.

As described above in FIG. 3, assumption is made wherein ten virtual machines of which the capabilities are "1" may be laid out on one physical machine 73. On the other hand, the capabilities of the virtual machines corresponding to the assignment request of R#1 are "3". Further, no virtual machine is laid on all of the physical machines 73 at the time of T1. Therefore, the virtual machines are laid out sequentially from the physical machine 73 with the head physical machine ID "M#1". Note that, with regard to virtual machine IDs, the virtual machine IDs shown in FIG. 3, FIG. 5A, and FIG. 5B are used.

FIG. 12 through FIG. 18 are diagrams illustrating assignment of virtual machines according to the information processing system 1000 of the first embodiment.

As described above in FIG. 11, an assignment request is input from the resource A at the point-in-time T1.

Figure 12A:
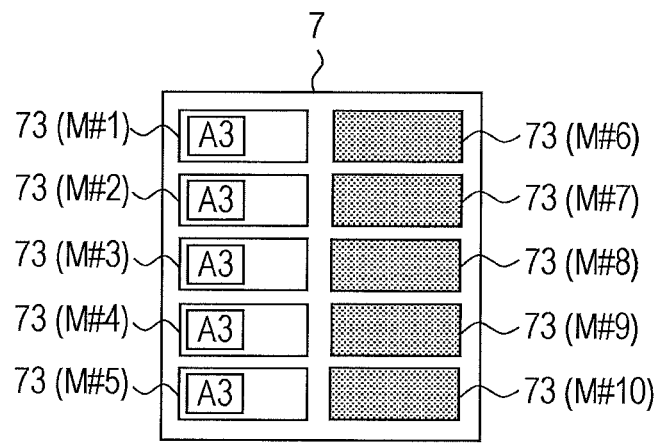
FIG. 12A and FIG. 12B are diagrams illustrating input of an assignment request according to the information processing system of the first embodiment.

The first design unit 26 reads in the physical machine information of the physical machine information storage unit 34, and the existing layout information of the layout information storage unit 35 via the first read-in unit 23 to design new layout design information. Next, the first design unit 26 stores the layout design information shown in FIG. 7B in the layout information storage unit 35. As shown in FIG. 12A, the arrangement unit/movement arrangement unit 38 of the control device 1 lays out the virtual machines corresponding to the assignment request of R#1 on the physical machines 73 of the physical machine group 7 based on the layout design information designed at the first design unit 26, and the arrangement information created at the creating unit 24. The arrangement unit/movement arrangement unit 38 arranges the virtual machines with management IDs "R#1-1" through "R#1-5" of the resource A on the physical machines 73 with physical machine IDs "M#1" through "M#5" one at a time, respectively.

Next, in FIG. 12A, the second design unit 27 reads in the request information of all of the resources of the request information storage unit 33, the physical machine information of the physical machine information storage unit 34, the layout information of the layout information storage unit 35, and the stand-by physical machine request information of the stand-by physical machine request information storage unit 37 via the second read-in unit 25. Next, the second design unit 27 determines whether or not the physical machines 73 within the physical machine group 7 satisfy the stand-by physical machine request information. Here, the number of the multiple physical machines 73 where a virtual machine is laid out of which the remaining capabilities are equal to or greater than "5" is "5", and accordingly satisfies the stand-by physical machine request count "5" wherein the stand-by physical machine request capability of the stand-by physical machine request information is "5". Next, when comparing the stand-by physical machine request capability of the stand-by physical machine request information, and the stand-by physical machine count, both are the same "5", and accordingly, the data center 100 is in an input waiting state of an assignment request.

Next, as shown in FIG. 11, an assignment request is input from the assignment request input unit 21 wherein "4" virtual machines of which the capabilities are "5" are requested from a resource B at point-in-time T2. The request information extracting unit 22 of the control device 1 appends a request ID "R#2" for the virtual machines to the input assignment request.

Figure 12B:
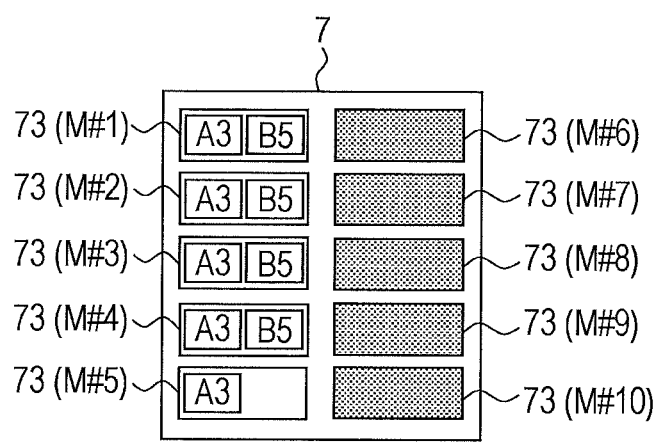

Next, as shown in FIG. 12B, the arrangement unit/movement arrangement unit 38 of the control device 1 arranges the virtual machines corresponding to the assignment request of R#2 on the physical machines 73 of the physical machine group 7 based on the layout design information designed at the first design unit 26, and the arrangement information created at the creating unit 24. Here, the virtual machines with management IDs "R#2-1" through "R#2-4" are arranged on the physical machines 73 with physical machine IDs "M#1" through "M#4", respectively.

In FIG. 12B, the second design unit 27 of the control device 1 reads in the request information of all of the resources of the request information storage unit 33, the physical machine information of the physical machine information storage unit 34, the layout information of the layout information storage unit 35, and the stand-by physical machine request information of the stand-by physical machine request information storage unit 37 via the second read-in unit 25. Next, the second design unit 27 determines whether or not the physical machines 73 within the physical machine group 7 satisfy the stand-by physical machine request information. The second design unit 27 obtains the remaining capability of each of the physical machines 73 with physical machine IDs "M#1" through "M#5" to which power is being applied described in FIG. 3. In FIG. 12B, the remaining capabilities of the physical machines 73 with physical machine IDs "M#1" through "M#4" are "2". The remaining capability of the physical machine 73 with physical machine ID "M#5" is "7".

Next, the second design unit 27 determines physical machines 73 of which the remaining capabilities are equal to or greater than "5" out of the physical machines 73 with physical machine IDs "M#1" through "M#5", and obtains the total number thereof. As a result of the determination, the total number of the physical machines 73 of which the remaining capabilities are equal to or greater than the stand-by physical machine request capability is "1" that is the physical machine 73 with physical machine ID "M#5".

The total number of the remaining capability "5" is less than "5", and accordingly, the stand-by physical machine request capability "5" does not satisfy the stand-by physical machine request count "5". Therefore, the stand-by physical machine request information of the information processing system 1000 is not satisfied.

Next, the second design unit 27 selects one physical machine 73 where multiple virtual machines are arranged, out of the physical machines with physical machine IDs "M#1" through "M#4" of which the remaining capabilities are smaller than the stand-by physical machine request capability. The selected physical machine 73 is the physical machine 73 with physical machine ID "M#4".

With the selected physical machine 73 with physical machine ID "M#4", the virtual machines with management IDs "R#1-4" and "R#2-4" which are multiple virtual machines are arranged. The second design unit 27 selects one virtual machine to be moved, out of the virtual machines with management IDs "R#1-4" and "R#2-4" so that the remaining capability of the selected physical machine 73 with physical machine ID "M#4" becomes equal to or greater than the stand-by physical machine request capability. Here, the selected virtual machine to be moved is the virtual machine with management ID "R#2-4".

Figure 13A:
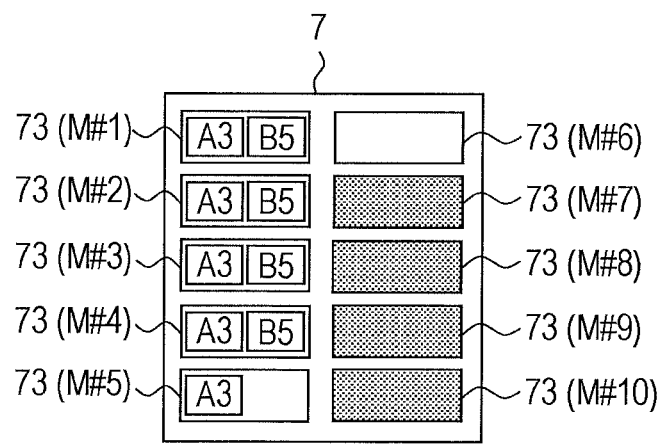
FIG. 13A and FIG. 13B are diagrams illustrating input of an assignment request according to the information processing system of the first embodiment.

In FIG. 13A, the second design unit 27 selects the physical machine 73 with physical machine ID "M#6" as a temporary arrangement destination of the virtual machine with management ID "R#2-4" to be moved. The second design unit 27 takes the state of the selected physical machine 73 with physical machine ID "M#6" as "temporary on". The second design unit 27 creates layout design information (FIG. 13B) for performing re-layout of the virtual machine shown in FIG. 7C with this physical machine ID "M#6" as a temporary arrangement destination. The creating unit 24 creates the movement information shown in FIG. 8D based on the layout design information shown in FIG. 7C.

Figure 13B:
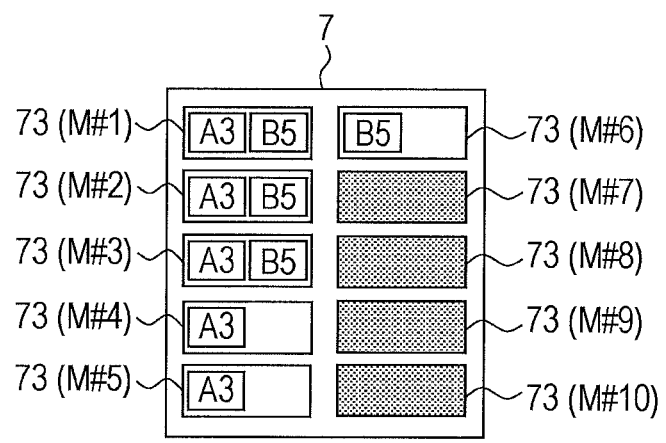

In FIG. 13B, the second design unit 27 determines whether or not the physical machines 73 within the physical machine group 7 satisfy the stand-by physical machine information in the same way as described above in FIG. 12A.

The second design unit 27 obtains the remaining capability of each of the physical machines 73 with physical machine IDs "M#1" through "M#6" to which power is being applied including the physical machine of which the power state is temporary on. In FIG. 13B, the remaining capabilities of the physical machines 73 with physical machine IDs "M#1" through "M#3" are "2". The remaining capabilities of the physical machines 73 with physical machine IDs "M#4" and "M#5" are "7". The remaining capability of the physical machine 73 with physical machine ID "M#6" is "5". Therefore, the total number of physical machines 73 satisfying request capability "5" is "3", and is less than "5" of the stand-by physical machine request count. Therefore, the second design unit 27 determines that the stand-by physical machine request information of the information processing system 1000 is not satisfied.

Next, the second design unit 27 selects one physical machine 73 where multiple virtual machines are arranged, out of the physical machines 73 with physical machine IDs "M#1" through "M#3" of which the remaining capabilities are smaller than the request capability. The selected physical machine 73 is the physical machine 73 with physical machine ID "M#3".

With the selected physical machine 73 with physical machine ID "M#3", the virtual machines with management IDs "R#1-3" and "R#2-3" which are multiple virtual machines are arranged. The second design unit 27 selects one virtual machine to be moved, out of the virtual machines with management IDs "R#1-3" and "R#2-3" so that the remaining capability of the selected physical machine 73 with physical machine ID "M#3" becomes equal to or greater than the stand-by physical machine request capability. Here, the selected virtual machine to be moved is the virtual machine with management ID "R#2-3".

Figure 14A:
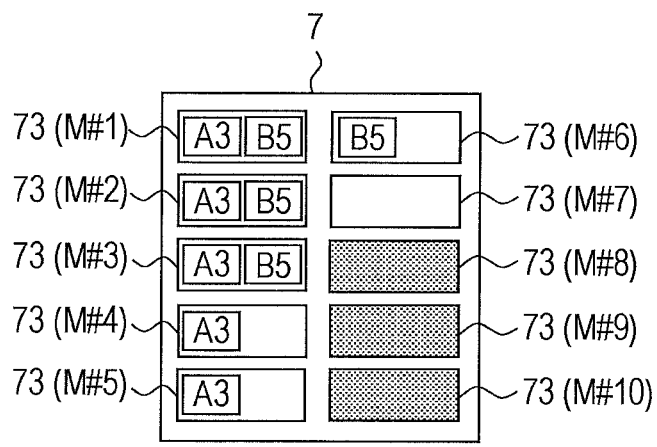
FIG. 14A and FIG. 14B are diagrams illustrating input of an assignment request according to the information processing system of the first embodiment.

In FIG. 14A, the second design unit 27 selects the physical machine 73 with physical machine ID "M#7" as a temporary arrangement destination of the virtual machine with management ID "R#2-3" to be moved. The second design unit 27 references the physical machine information of the physical machine information storage unit 34 to take the state of the selected physical machine 73 with physical machine ID "M#7" as "temporary on" shown in FIG. 6C. The second design unit 27 creates layout design information (FIG. 14B) for performing re-layout of the virtual machine shown in FIG. 7D with this physical machine 73 with the physical machine ID "M#7" as a temporary arrangement destination. The creating unit 24 creates the movement information shown in FIG. 8E based on the layout design information shown in FIG. 7D.

Figure 14B:
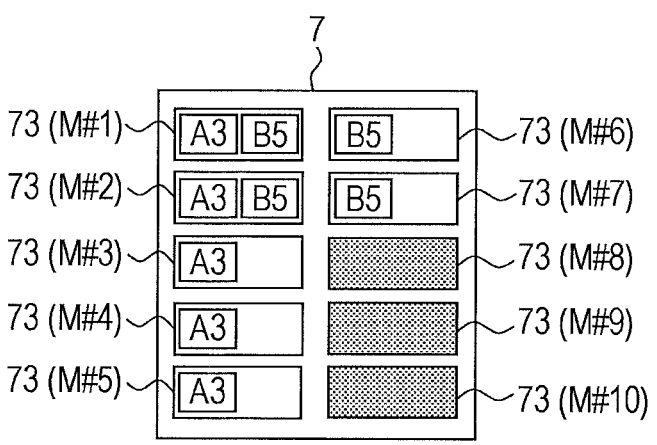

In FIG. 14B, the second design unit 27 determines whether or not the physical machines 73 within the physical machine group 7 satisfy the stand-by physical machine information in the same way as described above in FIG. 12A.

The second design unit 27 determines that, with the physical machines 73 to which power is being applied including the physical machine of which the power state is temporary on, there are "5" physical machines 73 of which the remaining capabilities are equal to or greater than "5", and accordingly, the stand-by physical machine request information of the information processing system 1000 is satisfied.

Next, the second design unit 27 turns on the powers of the physical machines 73 with physical machine IDs "M#6" and "M#7" via the power-on/power-off unit 28 based on the layout design information shown in FIG. 7D and the physical machine information shown in FIG. 6C.

Next, the second design unit 27 writes layout design information updated from the temporary information of the physical machines 73 including information of "temporary on" of the physical machine 73, and "temporary movement" of the physical machine 73 to formal information in the layout design information storage unit 35. Next, the second design unit 27 writes physical machine information updated from the temporary information of the physical machines 73 to formal information in the physical machine storage unit 34.

Next, the creating unit 24 of the control device 1 writes movement information updated from the above temporary information to formal information in the arrangement information/movement information storage unit 36.

Next, the arrangement unit/movement arrangement unit 38 moves the virtual machine with management ID "R#2-4" from the physical machine 73 with physical machine ID "M#4" to the physical machine 73 with physical machine ID "M#6" based on the movement information of the arrangement information/movement information storage unit 36. Next, the arrangement unit/movement arrangement unit 38 moves the virtual machine with management ID "R#2-3" from the physical machine 73 with physical machine ID "M#3" to the physical machine 73 with physical machine ID "M#7".

Next, the arrangement unit/movement arrangement unit 38 overwrites the movement information of the arrangement information/movement information storage unit 36 on an unused state.

As described above, the arrangement processing unit 2 of the control device 1 repeatedly executes a process from FIG. 12A to FIG. 14B until the total number of the physical machines 73 of which the remaining capabilities satisfy the stand-by physical machine request capability satisfies the stand-by physical machine request count. The process from FIG. 12A to FIG. 14B is repeatedly executed, whereby the powers of the physical machines 73 may be turned on until the number of the physical machines 73 satisfying the stand-by physical machine request capability satisfies the stand-by physical machine request count at minimum. The number of the physical machines 73 to which power is being applied may be set to the minimum, whereby low power consumption of the information processing system 1000 including the data center 100 may be realized.

Further, at the time of an instruction for adding a virtual machine being performed, in the event that the processing of this virtual machine may be processed with only the physical machines 73 under activation, the arrangement processing unit 2 arranges this virtual machine on the physical machines 73 under activation. In parallel with this, when the remaining capabilities of the physical machines 73 are equal to or smaller than a predetermined capability, the arrangement processing unit 2 activates a physical machine 73 which has not been activated, and at the time of this activation being completed, a part of virtual machines which the already activated physical machines are processing are to be moved. Accordingly, even if a physical machine 73 where no virtual machine is arranged has not been activated, the processing of a virtual machine newly requested to be added may be realized without making the user wait.

Next, as shown in FIG. 11, an assignment request is input from the assignment request input unit 21 wherein "4" virtual machines of which the capabilities are "4" are requested from a resource C at point-in-time T3. The request information extracting unit 22 of the control device 1 appends a request ID "R#3" for the virtual machines to the input assignment request.

Figure 15A:
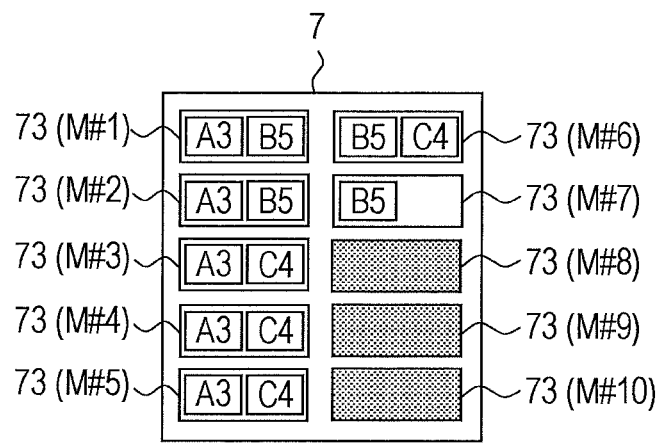
FIG. 15A and FIG. 15B are diagrams illustrating input of an assignment request according to the information processing system of the first embodiment.

Next, as shown in FIG. 15A, the arrangement unit/movement arrangement unit 38 of the control device 1 arranges the virtual machines corresponding to the assignment request of R#3 on the physical machines 73 of the physical machine group 7 based on the layout design information designed at the first design unit 26, and the arrangement information created at the creating unit 24. Here, the virtual machines with management IDs "R#3-1" through "R#3-4" are arranged on the physical machines 73 with physical machine IDs "M#3" through "M#6", respectively.

In FIG. 15A, the second design unit 27 reads in the request information of all of the resources of the request information storage unit 33, the physical machine information of the physical machine information storage unit 34, the layout information of the layout information storage unit 35, and the stand-by physical machine request information of the stand-by physical machine request information storage unit 37 via the second read-in unit 25. Next, the second design unit 27 determines whether or not the physical machines 73 within the physical machine group 7 satisfy the stand-by physical machine request information. In FIG. 15A, the number of the physical machines 73 of which the remaining capabilities are equal to or greater than the stand-by physical machine request capability "5" is only one of the physical machine 73 with physical machine ID "M#7" having the remaining capability "5", and accordingly, the stand-by physical machine request information is not satisfied.

Next, the second design unit 27 selects one physical machine 73 where multiple virtual machines are arranged, out of the physical machines 73 with physical machine IDs "M#1" through "M#6" of which the remaining capabilities are smaller than the request capability. The selected physical machine 73 is the physical machine 73 with physical machine ID "M#6".

With the selected physical machine 73 with physical machine ID "M#6", the virtual machines with management IDs "R#2-3" and "R#3-4" which are multiple virtual machines are arranged. The second design unit 27 selects one virtual machine to be moved, out of the virtual machines with management IDs "R#2-3" and "R#3-4" so that the remaining capability of the selected physical machine 73 with the selected physical machine ID "M#6" becomes equal to or greater than the stand-by physical machine request capability. Here, the selected virtual machine to be moved is the virtual machine with management ID "R#3-4".

Figure 15B:
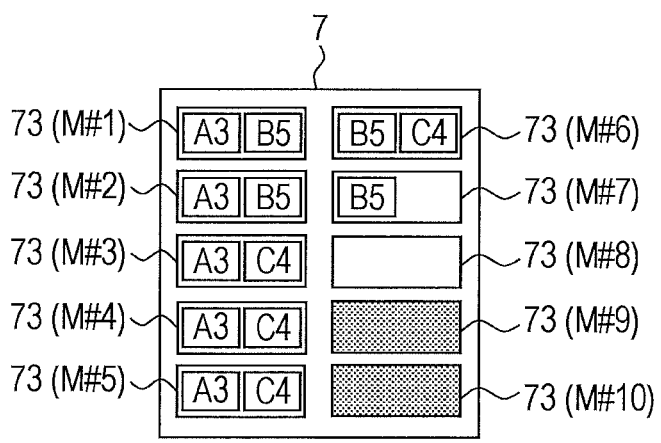

In FIG. 15B, the second design unit 27 selects the physical machine 73 with physical machine ID "M#8" as a temporary arrangement destination of the virtual machine with management ID "R#3-4" to be moved. The second design unit 27 takes the state of the selected physical machine 73 with physical machine ID "M#8" as "temporary on". The second design unit 27 creates layout design information indicating that the virtual machine with management ID "R#3-4" is temporarily arranged on this physical machine 73 with physical machine ID "M#8". The creating unit 24 creates movement information based on difference information of the layout design information.

Figure 16A:
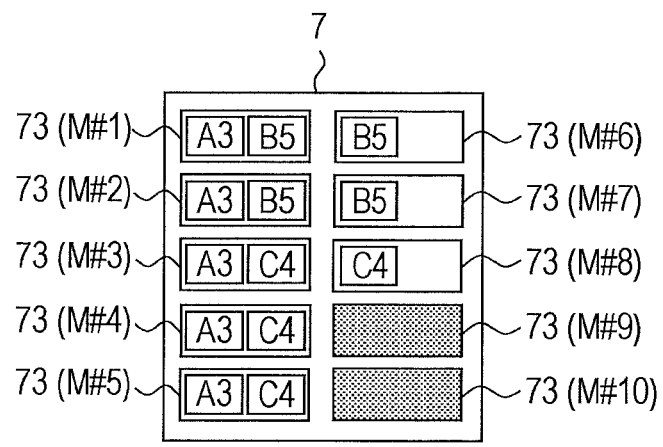
FIG. 16A and FIG. 16B are diagrams illustrating input of an assignment request according to the information processing system of the first embodiment.

In FIG. 16A, the second design unit 27 determines whether or not the physical machines 73 within the physical machine group 7 satisfy the stand-by physical machine information in the same way as described above in FIG. 12A.

In FIG. 16A, the number of physical machines 73 of which the remaining capabilities are equal to or greater than the stand-by physical machine request capability "5" is three, and accordingly, the stand-by physical machine request information is not satisfied.

Next, the second design unit 27 selects one physical machine 73 where multiple virtual machines are arranged, out of the physical machines 73 with physical machine IDs "M#1" through "M#5" of which the remaining capabilities are smaller than the request capability. The selected physical machine 73 is the physical machine 73 with physical machine ID "M#2".

With the selected physical machine 73 with physical machine ID "M#2", the virtual machines with management IDs "R#1-2" and "R#2-2" which are multiple virtual machines are arranged. The second design unit 27 selects one virtual machine to be moved, out of the virtual machines with management IDs "R#1-2" and "R#2-2" so that the remaining capability of the selected physical machine 73 with physical machine ID "M#2" becomes equal to or greater than the stand-by physical machine request capability. Here, the selected virtual machine to be moved is the virtual machine with management ID "R#2-2".

Figure 16B:
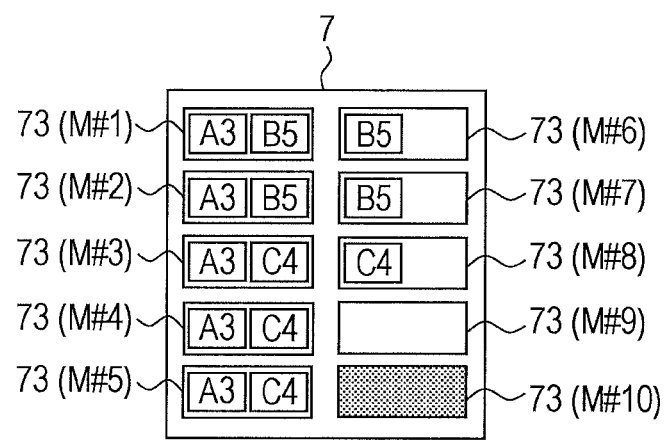

In FIG. 16B, the second design unit 27 selects the physical machine 73 with physical machine ID "M#9" as a temporary arrangement destination of the virtual machine with management ID "R#2-2" to be moved. The second design unit 27 takes the state of the selected physical machine 73 with physical machine ID "M#9" as "temporary on". The second design unit 27 creates layout design information indicating that the virtual machine with management ID "R#2-2" is temporarily arranged on this physical machine 73 with physical machine ID "M#9". The creating unit 24 creates movement information based on difference information of the layout design information.

Figure 17A:
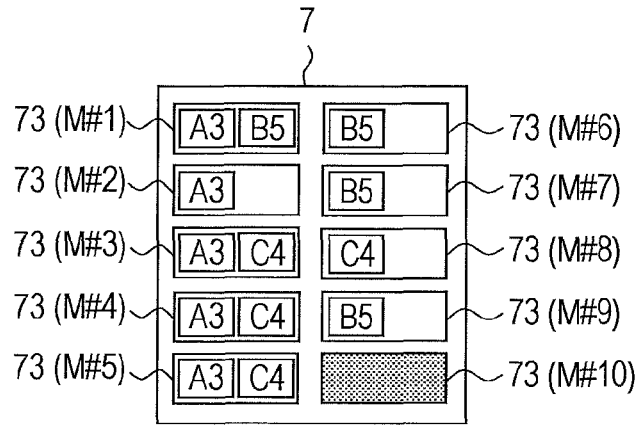
FIG. 17A and FIG. 17B are diagrams illustrating input of an assignment request according to the information processing system of the first embodiment.

In FIG. 17A, the second design unit 27 determines whether or not the stand-by physical machine information is satisfied in the same way as described above in FIG. 12A.

In FIG. 17A, with the physical machines 73 to which power is being applied including the physical machine of which the power state is temporary on, there are "5" physical machines 73 of which the remaining capabilities are equal to or greater than "5", and accordingly, the stand-by physical machine request information of the information processing system 1000 is satisfied.

Next, the second design unit 27 turns on the powers of the physical machines 73 with physical machine IDs "M#8" and "M#9" via the power-on/power-off unit 28 based on the layout design information designed in FIG. 16B and the physical machine information of which the power state has been changed.

Next, the second design unit 27 writes layout design information updated from the temporary information of the physical machines 73 including information of "temporary on" of the physical machine 73, and "temporary movement" of the physical machine 73 to formal information in the layout design information storage unit 35, and writes physical machine information updated from the temporary information of the physical machines 73 to formal information in the physical machine storage unit 34.

Next, the creating unit 24 writes movement information updated from the above temporary information to formal information in the arrangement information/movement information storage unit 36.

Next, the arrangement unit/movement arrangement unit 38 moves the virtual machine with management ID "R#3-4" from the physical machine 73 with physical machine ID "M#6" to the physical machine 73 with physical machine ID "M#8" based on the movement information of the arrangement information/movement information storage unit 36. Next, the arrangement unit/movement arrangement unit 38 moves the virtual machine with management ID "R#2-2" from the physical machine 73 with physical machine ID "M#2" to the physical machine 73 with physical machine ID "M#9".

Next, the arrangement unit/movement arrangement unit 38 overwrites the movement information of the arrangement information/movement information storage unit 36 on an unused state.

As described above, the arrangement processing unit 2 repeatedly executes a process from FIG. 15A to FIG. 17A until the total number of the physical machines 73 of which the remaining capabilities satisfy the stand-by physical machine request capability satisfies the stand-by physical machine request count. The process from FIG. 15A to FIG. 17A is repeatedly executed, whereby the powers of the physical machines 73 are turned on until the number of the physical machines 73 satisfying the stand-by physical machine request capability satisfies the stand-by physical machine request count at minimum. The number of the physical machines 73 to which power is being applied may be set to the minimum, whereby low power consumption of the information processing system 1000 including the data center 100 may be realized.

Next, as shown in FIG. 11, an assignment request is input from the assignment request input unit 21 wherein deletion of "2" virtual machines with management IDs "R#1-2" and "R#1-3" of which the capabilities are "3" is requested from a resource A at point-in-time T4. The request information extracting unit 22 of the control device 1 appends a request ID "R#4" for the virtual machines to the input assignment request.

Figure 17B:
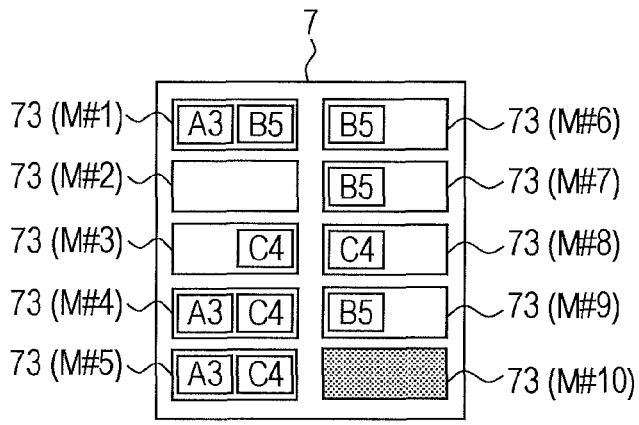

Next, as shown in FIG. 17B, the first design unit 26 creates layout design information for deleting the virtual machines with management IDs "R#1-2" and "R#1-3" corresponding to the assignment request of R#4 from the physical machine 73 of the physical machine group 7. The first design unit 26 writes the created layout design information in the layout design information storage unit 35. Next, the first design unit 26 transmits the created layout design information to the creating unit 24. The creating unit 24 creates movement information based on the difference information of the layout design information. The creating unit 24 writes the created movement information in the arrangement information/movement information storage unit 36. Note that the movement information in FIG. 17B indicates deletion information.

In FIG. 17B, the arrangement unit/movement arrangement unit 38 reads in the movement information from the arrangement information/movement information storage unit 36, and deletes the virtual machines with management IDs "R#1-2" and "R#1-3" of the resource A. The virtual machines with management IDs "R#1-2" and "R#1-3" are deleted from the physical machines 73 with physical machine IDs "M#2" and "M#3". Consequently, as shown in FIG. 17B, all of the virtual machines have been moved from the physical machine with physical machine ID "M#2".

In FIG. 17B, the second design unit 27 reads in the request information of all of the resources of the request information storage unit 33, the physical machine information of the physical machine information storage unit 34, the layout information of the layout information storage unit 35, and the stand-by physical machine request information of the stand-by physical machine request information storage unit 37 via the second read-in unit 25. Next, the second design unit 27 determines whether or not the physical machines 73 within the physical machine group 7 satisfy the stand-by physical machine request information.

In FIG. 17B, there are five or more physical machines 73 of which the remaining capabilities are equal to or greater than the stand-by physical machine request capability "5", and accordingly, the stand-by physical machine request information is satisfied.

Next, the second design unit 27 determines whether or not the number of physical machines 73 of which the remaining capabilities are equal to or greater than the stand-by physical machine request capability "5" is greater than the stand-by physical machine request count. In FIG. 17B, there are six physical machines 73 of which the remaining capabilities are equal to or greater than the stand-by physical machine request capability "5", which is determined to be greater than the stand-by physical machine request count "5".

Next, the second design unit 27 determines whether or not there is a physical machine 73 where no virtual machine is arranged of the six physical machines 73 of which the remaining capabilities are equal to or greater than the stand-by physical machine request capability "5".

In FIG. 17B, the physical machine 73 with physical machine ID "M#2" is determined to satisfy the condition to be determined.

Figure 18:
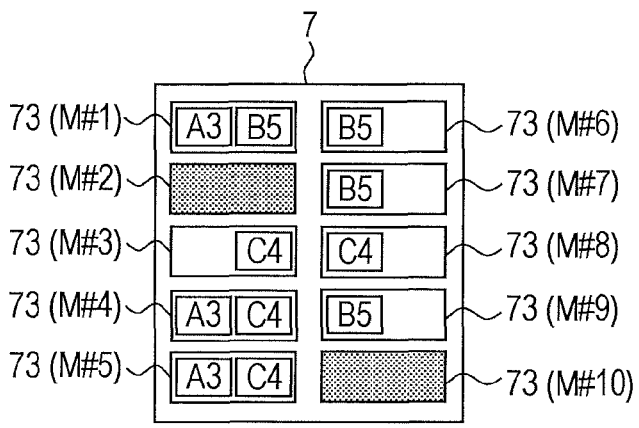
FIG. 18 is a diagram illustrating input of an assignment request according to the information processing system of the first embodiment.

Next, as shown in FIG. 18, the second design unit 27 turns off the power of the physical machine 73 with physical machine ID "M#2" via the power-on/power-off unit 28.

Next, again, the second design unit 27 determines whether or not the number of physical machines 73 of which the remaining capabilities are equal to or greater than the stand-by physical machine request capability "5". In FIG. 18, there are five physical machines 73 of which the remaining capabilities are equal to or greater than the stand-by physical machine request capability "5", which is not determined to be greater than the stand-by physical machine request count "5". Therefore, the control device 1 is in an assignment request input waiting state. The power of the physical machine 73 is turned off, whereby low power consumption of the information processing system 1000 including the data center 100 may be realized.

Note that, in FIG. 11, in the event that the virtual machines to be deleted are not specified, and just deletion of "2" virtual machines of the capabilities are "3" of the resource A is specified, an optional virtual machine may be selected, and accordingly, in FIG. 17B, the control device 1 may delete a virtual machine arranged on the physical machine 73 of which the remaining capability is the greatest to create a remaining physical machine 73.

Note that the physical machines perform processing for activating or restoring the OS after power-on is performed, and accordingly, it takes several tens of seconds to enable a virtual machine which operates on this OS to be used.

Therefore, if it is determined to perform activation of a physical machine to which no power is applied at the time of a virtual machine that the user requested to add failing to be arranged on an operating physical machine, it may take several tens of seconds for the user to use the virtual machine since the user requested.

Accordingly, with the current information processing system, it is conceived to make physical machines of which the number includes a number assumed to run short in the future operate (activate) based on the past processing experience (time zone) and so forth. However, this is processing consistently based on prediction, and accordingly, it is desirable to make more physical machines than an actual predicted value activate to realize a system wherein the user is prevented from waiting for start of processing of the virtual machine at the very least.

As a result thereof, there is constantly an operating physical machine regardless of no virtual machine being arranged, which causes a phenomenon in that extra power is consumed.

Particularly, in recent years, in order to maintain continuity of the service by handling unexpected failure or trouble of a physical machine, it has been performed that multiple virtual machines which the same user uses are arranged by being classified into several physical machines. With such a system, the user has to secure at least multiple operating physical machines regardless of no virtual machine being arranged, to perform a request for adding multiple virtual machines at once.

According to the method for changing the deployment of the virtual machine and the apparatus for changing the deployment of the virtual machine according to the first embodiment, in the event that the total number of physical machines 73 satisfying the stand-by physical machine request capability is smaller than a predetermined stand-by physical machine request count, the control device 1 selects one physical machine 73 where multiple virtual machines are arranged, out of physical machines 73 of which the remaining capabilities are smaller than the stand-by physical machine request capability. Next, the control device 1 selects one virtual machine to be moved, out of the multiple virtual machines arranged on the selected individual physical machines 73 so that the remaining capabilities of the selected individual physical machines 73 become the stand-by physical machine request capability or more. Therefore, the control device 1 applies power to the physical machines 73 until the number of physical machines 73 satisfying the stand-by physical machine request capability satisfies the stand-by physical machine request count at minimum. The number of physical machines 73 to which power is being applied may be set to the minimum, whereby low power consumption of the information processing system 1000 including the data center 100 may be realized.

Further, at the time of an instruction for adding a virtual machine having been performed, in the event that the processing of this virtual machine may be processed even by a physical machine 73 under activation, the control device 1 arranges this virtual machine on this physical machine 73 under activation. In parallel with this, if the remaining capabilities of the physical machines 73 are equal to or smaller than a predetermined capability, the control device 1 activates a physical machine 73 which has not been activated, and at the time of this activation having been completed, moves a part of virtual machines which the already activated physical machine 73 is processing. Accordingly, even if a physical machine 73 where no virtual machine is arranged has not been activated, the processing of a virtual machine which has newly been requested to be added may be realized without making the user wait. Further, the power of a physical machine 73 where no virtual machine is arranged is turned off, whereby low power consumption of the information processing system 1000 may be realized.

In FIG. 19 through FIG. 26, an information processing system 1000A according a second embodiment, a control method and a control program thereof will be described. Note that, with the second embodiment, the same configurations as the configurations described in the first embodiment are denoted with the same reference numerals, and description thereof will be omitted.

According to a technique disclosed in the second embodiment, in addition to the technique disclosed in the first embodiment, in the event that the total number is smaller than a predetermined number, a control device 1A selects physical machines 73 where multiple virtual machines are arranged of which the number is equivalent to an integer number of a half of difference between a predetermined number and the total number. According to such an arrangement, movement efficiency of a virtual machine as to a physical machine 73 may be improved as compared to the first embodiment. Note that the hardware configuration of the information processing system 1000A according to the second embodiment is the same as the hardware configuration of the information processing system 1000 according to the first embodiment, and accordingly, description thereof will be omitted.

Figure 19:
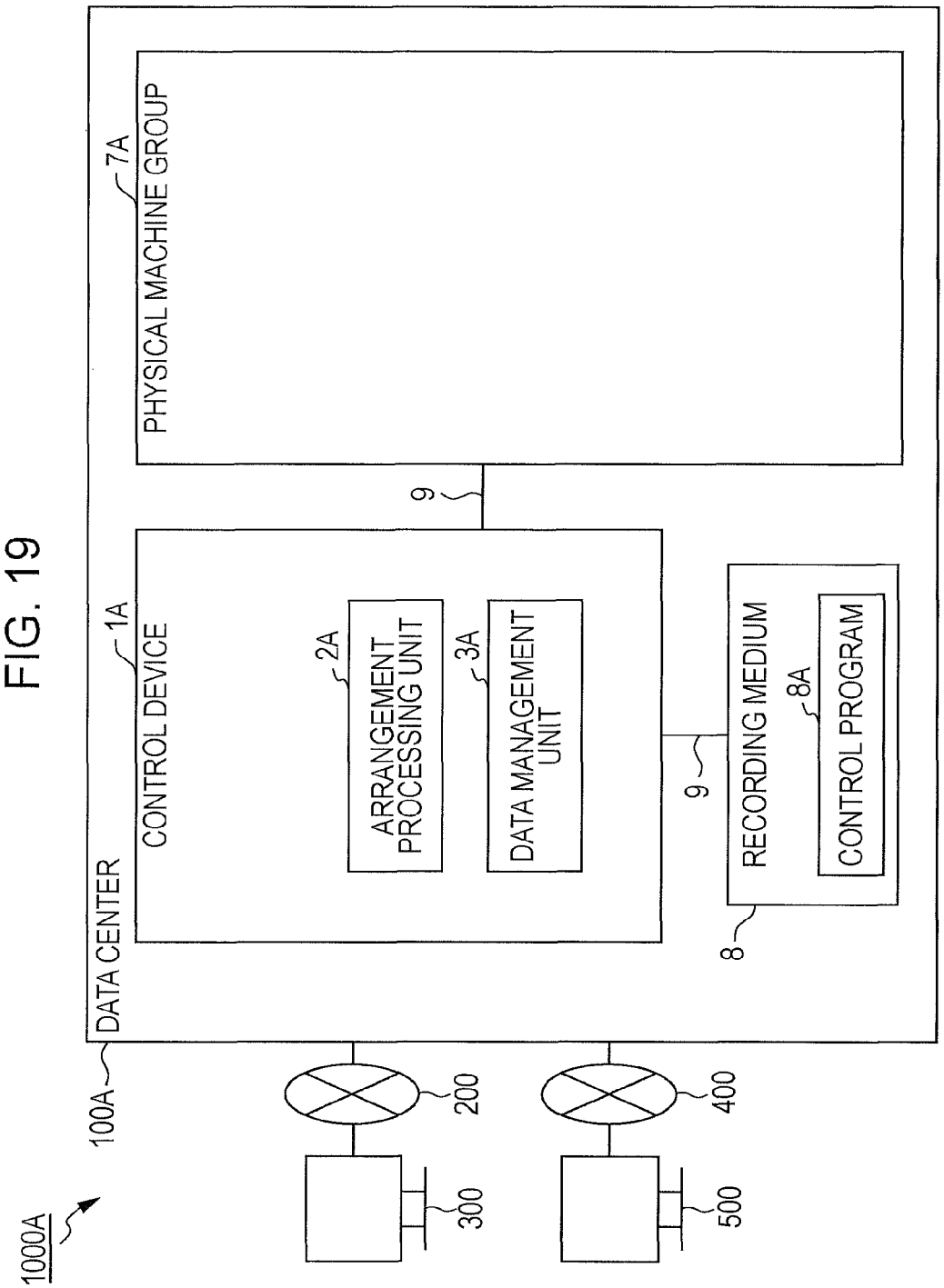
FIG. 19 is a diagram illustrating an example of the function block diagram of an information processing system according to a second embodiment.

FIG. 19 is a diagram illustrating an example of the function block diagram of the information processing system 1000A according to the second embodiment.

The information processing system 1000A includes, in the same way as the information processing system 1000 according to the first embodiment, a data center 100A, a user terminal 300, a resource request terminal 500, a network 200 which connects between the data center 100A and the user terminal 300, and a network 400 which connects between the data center 100A and a resource request terminal 500.

The data center 100A includes, in the same way as the data center 100 according to the first embodiment, a control device 1A, a physical machine group 7A, and a recording medium 8.

The control device 1A includes, in the same way as the control device 1 according to the first embodiment, an arrangement processing unit 2A and a data management unit (storage unit) 3A. The control device 1A will be described later with reference to FIG. 20. The physical machine group 7A includes, in the same way as the physical machine group 7 shown in FIG. 3 in the first embodiment, multiple physical machines 73 (not shown in the drawing).

Figure 20:
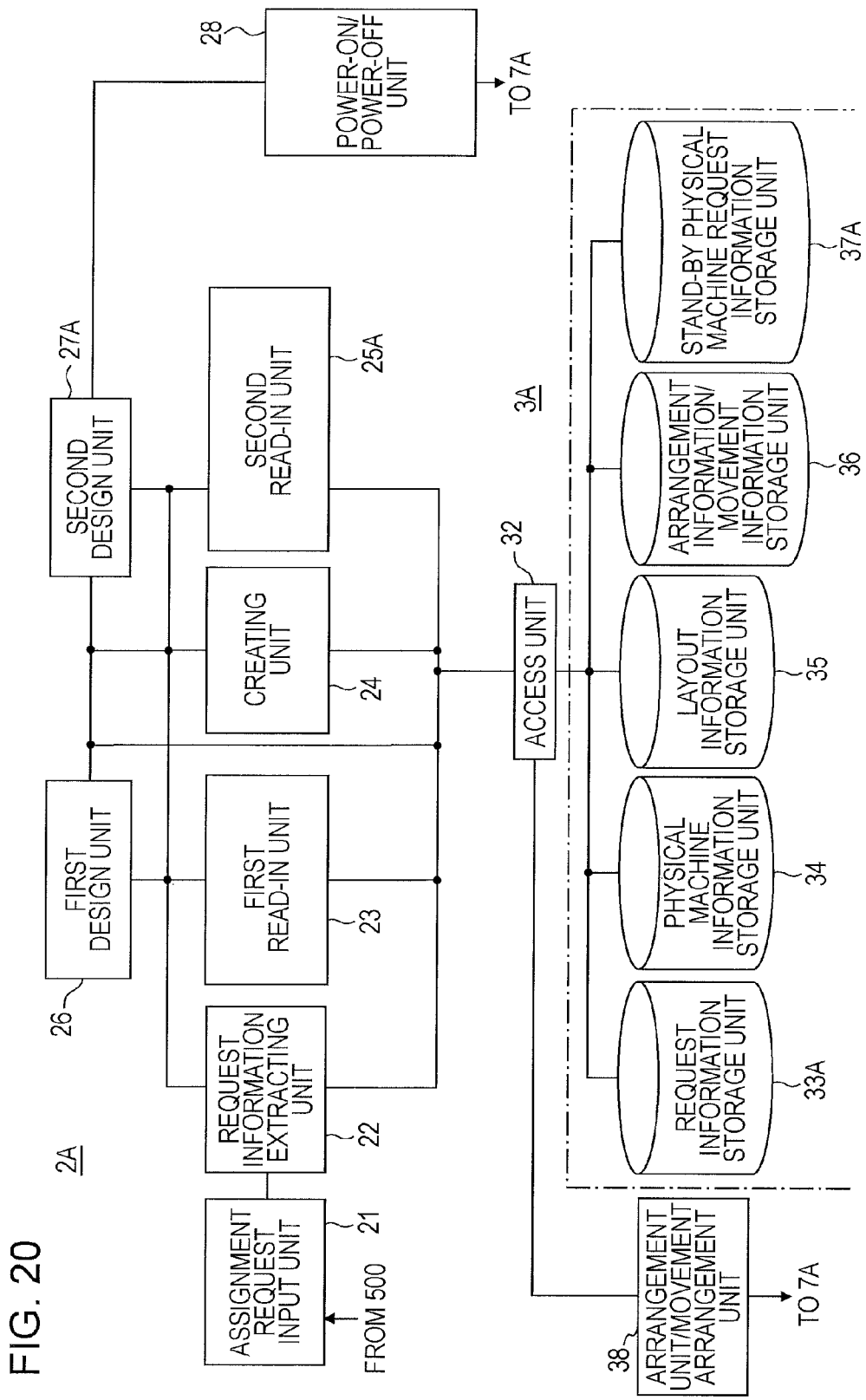
FIG. 20 is a diagram illustrating an example of the function block diagram of the information processing system according to the second embodiment.

FIG. 20 is a diagram illustrating an example of the function block diagram of the information processing system 1000A according to the second embodiment, and is a diagram illustrating the control device 1A.

With the control device 1A, the arrangement processing unit 2A receives, in the same way as the arrangement processing unit 2 according to the first embodiment, the virtual machine assignment request input from the resource request terminal 500. The arrangement processing unit 2A performs layout design for laying out the assign-requested virtual machine on the physical machines 73 of the physical machine group 7A based on the input virtual machine assignment request. In the event that a virtual machine movement condition is satisfied, the arrangement processing unit 2A performs re-layout design for moving a virtual machine on a physical machine 73 of the physical machine group 7A onto another physical machine 73 of the physical machine group 7A. The arrangement processing unit 2A creates movement information based on the re-layout design.

Note that actual arrangement of a virtual machine is executed by the data management unit (storage unit) 3A in the same way as with the data management unit (storage unit) 3 according to the first embodiment. Accordingly, the arrangement processing unit 2A actually determines the layout of a virtual machine in the physical machine group 7A.

The arrangement processing unit 2A includes an assignment request input unit 21, a request information extracting unit 22, a first read-in unit 23, a creating unit 24, a second read-in unit 25A, a first design unit 26, a second design unit 27A, a power-on/power-off unit 28, an access unit 32, and an arrangement unit/movement arrangement unit 38.

The second read-in unit 25A reads in, in the same way as the second read-in unit 25 according to the first embodiment, entire resource request information from the request information storage unit 33. The second read-in unit 25A reads in physical machine information from the physical machine information storage unit 34. The second read-in unit 25A reads in layout information from the layout information storage unit 35. The second read-in unit 25A reads in stand-by physical machine request information from the stand-by physical machine request information storage unit 37A. The second read-in unit 25A transmits the read request information, physical machine information, layout information, and stand-by physical machine request information to the second design unit 27A.

The second design unit 27A creates layout design information where virtual machines are re-laid out based on the request information, physical machine information, existing layout design information, and stand-by physical machine request information, read in from the second read-in unit 25A. Note that the created layout design information includes difference information as to the existing layout design information. The second design unit 27A transmits the created layout design information to the creating unit 24 of the arrangement processing unit 2A. The second design unit 27A writes the created layout design information in the layout information storage unit 35 of the data management unit 3A via the access unit 32 of the data management unit (storage unit) 3A. The second design unit 27A creates layout design information used for re-layout of a virtual machine in accordance with the following procedure.

The second design unit 27A obtains the remaining capability of each of the multiple physical machines 73 during power-on using a dummy virtual machine which will be described later with reference to FIG. 22. The second design unit 27A determines physical machines 73 of which the remaining capabilities are equal to or greater than a request capability necessary for arranging one virtual machine, from the obtained remaining capabilities of the multiple physical machines 73. After determination, the second design unit 27A obtains the total number of physical machines 73 of which the remaining capabilities are equal to or greater than the stand-by physical machine request capability of the stand-by physical machine request information. In the event that the total number of physical machines 73 is smaller than the stand-by physical machine request count, the second design unit 27A selects physical machines 73 where multiple virtual machines are arranged of which the number is an integer number of a half of difference between a predetermined number and the total number, out of the physical machines 73 of which the remaining capabilities are smaller than the stand-by physical machine request capability. The second design unit 27A selects multiple virtual machines to be moved, out of multiple virtual machines arranged on the selected individual physical machines 73 so that the remaining capabilities of the selected individual physical machines 73 become equal to or greater than the request capability.

According to such an arrangement, movement efficiency of a virtual machine as to a physical machine 73 may be improved since the multiple virtual machines to be moved are selected, as compared to the information processing system 1000 according to the first embodiment.

The data management unit (storage unit) 3A includes a request information storage unit 33A, a physical machine information storage unit 34, a layout information storage unit 35, arrangement information/movement information storage unit 36, and a stand-by physical machine request information storage unit 37A.

The stand-by physical machine request information storage unit 37A stores the stand-by physical machine request count of a virtual machine and a dummy virtual machine, and the stand-by physical machine request capability of a virtual machine and a dummy virtual machine. The stand-by physical machine request count of a virtual machine and a dummy virtual machine, and the stand-by physical machine request capability of a virtual machine and a dummy virtual machine set by the operation director of the data center 100A. The stand-by physical machine request count of a virtual machine and a dummy virtual machine, and the stand-by physical machine request capability of a virtual machine and a dummy virtual machine may be set to an optional value. Also, the stand-by physical machine request count of a virtual machine and a dummy virtual machine, and the stand-by physical machine request capability of a virtual machine and a dummy virtual machine may be changed as appropriate. Note that the stand-by physical machine request information according to the second embodiment is obtained, in the same way as the stand-by physical machine request information according to the first embodiment, using the maximum request capability of a settable virtual machine and (the average number of virtual machines per user+offset count $\alpha$). The stand-by physical machine request capability of a virtual machine and a dummy virtual machine according to the second embodiment is set to "5" that is a settable maximum request capability in a resource assignment request. The stand-by physical machine request count of a virtual machine and a dummy virtual machine according to the second embodiment is set to "5" obtained by adding "1" of the offset count $\alpha$ to "4" that is the average virtual machine count per user according to the second embodiment.

FIG. 21 is a diagram illustrating input of an assignment request according to the information processing system 1000A according to the second embodiment.

As shown in FIG. 21, an assignment request is input from the resource A at the point-in-time T1. The input assignment request is a request wherein "5" virtual machines of which the capabilities are "3" are requested, and further, "5" dummy virtual machines of which the capabilities are "5" are requested. Upon the virtual machine assignment request being input, the data center 100A immediately starts the service. Accordingly, upon the assignment request being input from the assignment request input unit 21 at the point-in-time T1, the request information extracting unit 22 of the control device 1A appends the request ID "R#1" for virtual machines, and the request ID "R#D" for dummy virtual machines to the assignment request, extracts request information, and stores the extracted request information in the request information storage unit 33A shown in FIG. 21. The first design unit 26 reads in the physical machine information of the physical machine information storage unit 34, and the existing layout information of the layout information storage unit 35 via the first read-in unit 23, and designs new layout design information. The arrangement unit/movement arrangement unit 38 of the control device 1A lays out the virtual machines corresponding to R#1, and the dummy virtual machines corresponding to R#D on the physical machines 73 of the physical machine group 7A based on the new layout design information designed at the first design unit 26, and the arrangement information created at the creating unit 24.

FIG. 22 through FIG. 26 are diagrams illustrating an example of resource management according to the information processing system 1000A according to the second embodiment.

FIG. 22 is a diagram illustrating input of an assignment request according to the information processing system 1000A according to the second embodiment. As shown in FIG. 22, an assignment request is input from the resource A at the point-in-time T1. The input assignment request is a request wherein "5" virtual machines of which the capabilities are "3" are requested. Upon the virtual machine assignment request being input, the data center 100A immediately starts the service. Accordingly, upon the assignment request being input from the assignment request input unit 21 at the point-in-time T1, the request information extracting unit 22 of the control device 1A appends the request ID "R#1" for virtual machines to the assignment request, and extracts request information. The creating unit 24 of the control device 1A stores the extracted request information in the request information storage unit 33A. The second design unit 27A of the control device 1A reads in the physical machine information of the physical machine information storage unit 34, and the existing layout information of the layout information storage unit 35 via the first read-in unit 23, and designs new layout design information. The arrangement unit/movement arrangement unit 38 of the control device 1A lays out the virtual machines corresponding to R#1 on the physical machines 73 of the physical machine group 7A based on the new layout design information designed at the second design unit 27A, and the arrangement information created at the creating unit 24.

FIG. 23 through FIG. 26 are diagrams illustrating virtual machine assignment according to the information processing system 1000A according to the second embodiment.

As described above in FIG. 22, an assignment request is input from the resource A at the point-in-time T1.

The first design unit 26 reads in the physical machine information of the physical machine information storage unit 34, and the existing layout information of the layout information storage unit 35 via the first read-in unit 23, and designs new layout design information.

Figure 23A:
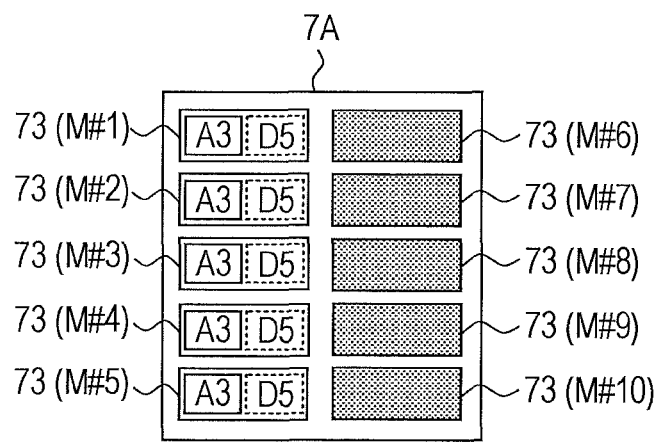
FIG. 23A and FIG. 23B are diagrams illustrating input of an assignment request according to the information processing system of the second embodiment.

Next, as shown in FIG. 23A, the arrangement unit/movement arrangement unit 38 of the control device 1A lays out virtual machines corresponding to R#1 and dummy virtual machines corresponding to R#D on the physical machines 73 of the physical machine group 7A based on the layout design information designed at the second design unit 27A, and the arrangement information created at the creating unit 24. Specifically, the arrangement unit/movement arrangement unit 38 lays out the virtual machines with management IDs "R#1-1" through "R#1-5", and the dummy virtual machines with management IDs "R#D-1" through "R#D-5" on the physical machines 73 with physical machine IDs "M#1" through "M#5" one at a time, respectively.

Next, in FIG. 23A, the second design unit 27A reads in the request information of all of the resources of the request information storage unit 33A, the physical machine information of the physical machine information storage unit 34, the layout information of the layout information storage unit 35, and the stand-by physical machine request information of the stand-by physical machine request information storage unit 37A via the second read-in unit 25A. Next, the second design unit 27A determines whether or not the physical machines 73 within the physical machine group 7 satisfy the stand-by physical machine request information. Here, the number of the multiple physical machines 73 where a dummy virtual machine is laid out of which the remaining capabilities are equal to or greater than "5" is "5", and accordingly satisfies the stand-by physical machine request information. Next, when comparing the stand-by physical machine request capability of the stand-by physical machine request information, and the stand-by physical machine count, both are the same "5", and accordingly, the data center 100A is in an input waiting state of an assignment request.

Next, as shown in FIG. 22, an assignment request is input from the assignment request input unit 21 wherein "4" virtual machines of which the capabilities are "5" are requested from the resource B at point-in-time T2. The request information extracting unit 22 of the control device 1A appends a request ID "R#2" for the virtual machines to the input assignment request.

Figure 23B:
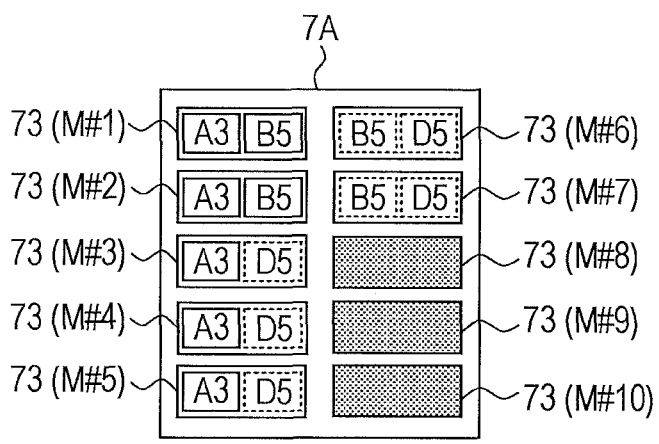

Next, as shown in FIG. 23B, the second design unit 27A creates dummy virtual machine and virtual machine layout design information for laying out dummy virtual machines and virtual machines corresponding to the assignment request of R#2 on the physical machines 73 of the physical machine group 7A. The creating unit 24 creates movement information based on the difference information of the layout design information.

The second design unit 27A creates dummy virtual machine layout design information for laying out a dummy virtual machine with management ID "R#D-1" on the physical machine 73 with physical machine ID "M#3". The creating unit 24 creates movement information from the difference information of the layout design information. The second design unit 27A creates dummy virtual machine layout design information for laying out a dummy virtual machine with management ID "R#D-2" on the physical machine 73 with physical machine ID "M#4". The creating unit 24 creates movement information from the difference information of the layout design information. The second design unit 27A creates dummy virtual machine layout design information for laying out a dummy virtual machine with management ID "R#D-3" on the physical machine 73 with physical machine ID "M#5". The creating unit 24 creates movement information from the difference information of the layout design information.

The second design unit 27A creates dummy virtual machine layout design information for laying out a dummy virtual machine with management ID "R#D-4" on the physical machine 73 with physical machine ID "M#6". The creating unit 24 creates movement information from the difference information of the layout design information. The second design unit 27A creates dummy virtual machine layout design information for laying out a dummy virtual machine with management ID "R#D-5" on the physical machine 73 with physical machine ID "M#7". The creating unit 24 creates movement information from the difference information of the layout design information. The second design unit 27A simulates a state in which the dummy virtual machine with management ID "R#D-5" is laid out on the physical machine 73 with physical machine ID "M#7". The creating unit 24 creates movement information from the difference information of the layout design information based on the simulation wherein the dummy virtual machine with management ID "R#D-5" is temporarily laid out on the physical machine 73 with physical machine ID "M#7".

As shown in FIG. 23B, the number of dummy virtual machines laid out on the physical machines 73 to which power is being applied is "3". On the other hand, the number of dummy virtual machines laid out on the physical machines 73 to which no power is being applied is "2". Accordingly, it is found that the number of multiple physical machines 73 where a virtual machine is laid out of which the remaining capabilities are equal to or greater than "5" is "3". The number of multiple physical machines 73 where a virtual machine is laid out of which the remaining capabilities are equal to or greater than "5" is less than "5", which does not satisfy the stand-by physical machine request information of the information processing system 1000A.

Next, in the event that the total number is smaller than a predetermined number, the second design unit 27A selects physical machines 73 where multiple virtual machines are arranged of which the number is an integer number of a half of difference between the predetermined number and the total number, out of the physical machines 73 of which the remaining capabilities are smaller than the request capability. The second design unit 27A creates virtual machine layout design information for laying out the virtual machine with management ID "R#2-1" on the physical machine 73 with physical machine ID "M#1". The creating unit 24 creates movement information from the difference information of the layout design information. The second design unit 27A creates virtual machine layout design information for laying out the virtual machine with management ID "R#2-2" on the physical machine 73 with physical machine ID "M#2". The creating unit 24 creates movement information from the difference information of the layout design information.

The second design unit 27A creates virtual machine layout design information for temporarily laying out a virtual machine with management ID "R#2-3" on the physical machine 73 with physical machine ID "M#6". The second design unit 27A creates virtual machine layout design information for temporarily laying out a virtual machine with management ID "R#2-4" on the physical machine 73 with physical machine ID "M#7". The creating unit 24 creates movement information from the difference information of the layout design information.

Figure 24A:
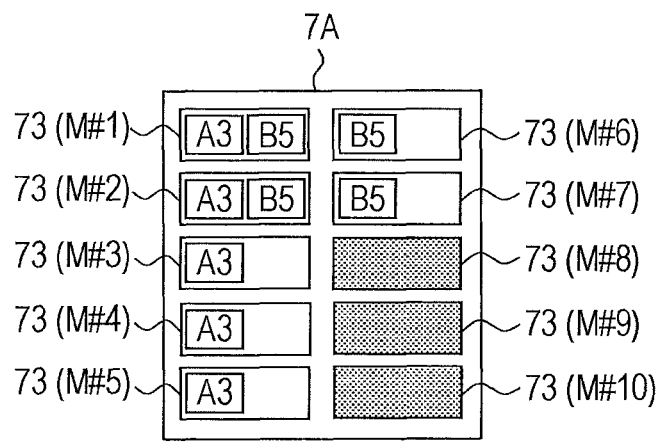
FIG. 24A and FIG. 24B are diagrams illustrating input of an assignment request according to the information processing system of the second embodiment.

In FIG. 24A, the second design unit 27A turns on the powers of the physical machines 73 with physical machine IDs "M#6" and "M#7" via the power-on/power-off unit 28 with reference to the created virtual machine layout design information and movement information.

Next, the arrangement unit/movement arrangement unit 38 lays out the virtual machine with management ID "R#2-3" on the physical machine 73 with physical machine ID "M#6" based on the movement information of the arrangement information/movement information storage unit 36. Similarly, the arrangement unit/movement arrangement unit 38 lays out the virtual machine with management ID "R#2-4" on the physical machine 73 with physical machine ID "M#7".

Note that, in FIG. 24A, the number of multiple physical machines 73 where a dummy virtual machine is laid out of which the remaining capabilities are equal to or greater than "5" is "5". There are "5" physical machines 73 where a dummy virtual machine is laid out of which the remaining capabilities are equal to or greater than "5", which satisfies the stand-by physical machine request information of the information processing system 1000A.

Next, as shown in FIG. 22, an assignment request is input from the assignment request input unit 21 wherein "4" virtual machines of which the capabilities are "4" are requested from the resource C at point-in-time T3. The request information extracting unit 22 of the control device 1A appends a request ID "R#3" for the virtual machines to the input assignment request.

Figure 24B:
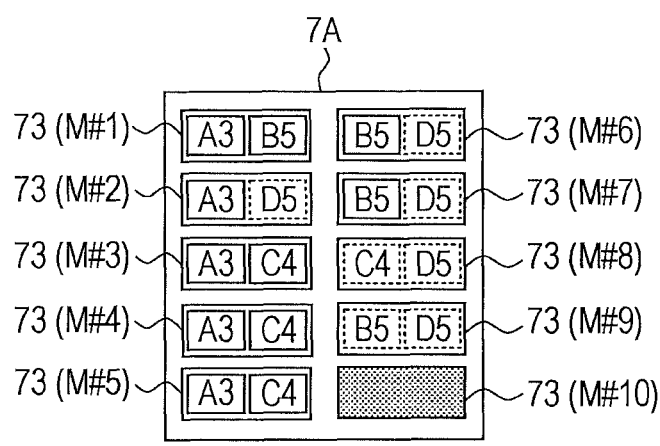

Next, as shown in FIG. 24B, the second design unit 27A creates dummy virtual machine and virtual machine layout design information for laying out dummy virtual machines and virtual machines corresponding to the assignment request of R#3 on the physical machines 73 of the physical machine group 7A. The creating unit 24 creates movement information from the difference information of the layout design information.

The second design unit 27A creates dummy virtual machine layout design information for laying out a dummy virtual machine with management ID "R#D-1" on the physical machine 73 with physical machine ID "M#2". The creating unit 24 creates movement information from the difference information of the layout design information. The second design unit 27A creates dummy virtual machine layout design information for laying out a dummy virtual machine with management ID "R#D-2" on the physical machine 73 with physical machine ID "M#6". The creating unit 24 creates movement information from the difference information of the layout design information. The second design unit 27A creates dummy virtual machine layout design information for laying out a dummy virtual machine with management ID "R#D-3" on the physical machine 73 with physical machine ID "M#7". The creating unit 24 creates movement information from the difference information of the layout design information.

Next, the second design unit 27A creates dummy virtual machine layout design information for laying out a dummy virtual machine with management ID "R#D-4" on the physical machine 73 with physical machine ID "M#8". The creating unit 24 creates movement information from the difference information of the layout design information. The second design unit 27A creates dummy virtual machine layout design information for laying out a dummy virtual machine with management ID "R#D-5" on the physical machine 73 with physical machine ID "M#9". The creating unit 24 creates movement information from the difference information of the layout design information.

As shown in FIG. 24B, the number of dummy virtual machines laid out on the physical machines 73 to which power is being applied is "3". On the other hand, the number of dummy virtual machines laid out on the physical machines 73 to which no power is being applied is "2". Accordingly, it is found that the number of multiple physical machines 73 where a virtual machine is laid out of which the remaining capabilities are equal to or greater than "5" is "3". The number of multiple physical machines 73 where a virtual machine is laid out of which the remaining capabilities are equal to or greater than "5" is less than "5", which does not satisfy the stand-by physical machine request information of the information processing system 1000A.

Next, in the event that the total number is smaller than a predetermined number, the second design unit 27A selects physical machines 73 where multiple virtual machines are arranged of which the number is an integer number of a half of difference between the predetermined number and the total number, out of the physical machines 73 of which the remaining capabilities are smaller than the request capability. The second design unit 27A creates virtual machine layout design information for laying out a virtual machine with management ID "R#3-1" on the physical machine 73 with physical machine ID "M#3". The creating unit 24 creates movement information from the difference information of the layout design information. The second design unit 27A creates virtual machine layout design information for laying out a virtual machine with management ID "R#3-2" on the physical machine 73 with physical machine ID "M#4". The creating unit 24 creates movement information from the difference information of the layout design information. The second design unit 27A creates virtual machine layout design information for laying out a virtual machine with management ID "R#3-3" on the physical machine 73 with physical machine ID "M#5". The creating unit 24 creates movement information from the difference information of the layout design information.

Next, the second design unit 27A creates virtual machine layout design information for temporarily laying out a virtual machine with management ID "R#3-4" on the physical machine 73 with physical machine ID "M#8". The creating unit 24 creates movement information from the difference information of the layout design information. The second design unit 27A creates virtual machine layout design information for temporarily laying out a virtual machine with management ID "R#2-4" on the physical machine 73 with physical machine ID "M#9". The creating unit 24 creates movement information from the difference information of the layout design information.

Figure 25A:
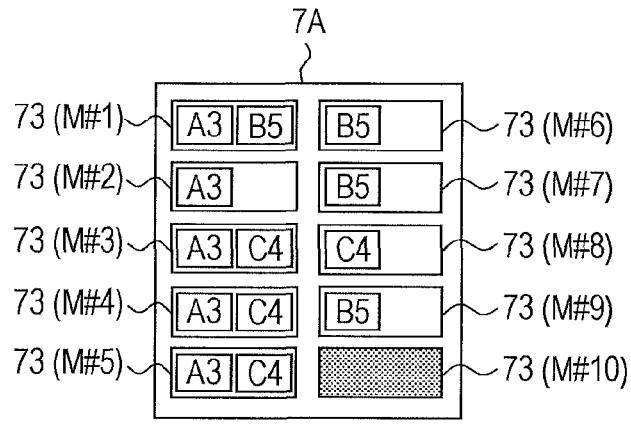
FIG. 25A and FIG. 25B are diagrams illustrating input of an assignment request according to the information processing system of the second embodiment.

In FIG. 25A, the second design unit 27A turns on the powers of the physical machines 73 with physical machine IDs "M#8" and "M#9" via the power-on/power-off unit 28 with reference to the created virtual machine layout design information and movement information.

Next, the arrangement unit/movement arrangement unit 38 lays out the virtual machine with management ID "R#3-4" on the physical machine 73 with physical machine ID "M#8" based on the movement information of the arrangement information/movement information storage unit 36. Similarly, the arrangement unit/movement arrangement unit 38 lays out the virtual machine with management ID "R#2-4" on the physical machine 73 with physical machine ID "M#9".

Note that, in FIG. 25A, the number of multiple physical machines 73 where a virtual machine is laid out of which the remaining capabilities are equal to or greater than "5" is "5". There are "5" or more physical machines 73 where a virtual machine is laid out of which the remaining capabilities are equal to or greater than "5", which satisfies the stand-by physical machine request information of the information processing system 1000A.

Note that the arrangement processing unit 2 of the control device 1 repeatedly executes a process from FIG. 23A to FIG. 25A until the total number of request capabilities becomes a predetermined number. The process from FIG. 23A to FIG. 25A is repeatedly executed, whereby the powers of the physical machines 73 may be turned on until the number of the physical machines 73 by the total number of physical machines 73 satisfying the request capability. The number of the physical machines 73 to which power is being applied may be set to the minimum, whereby low power consumption of the information processing system 1000A including the data center 100A may be realized.

Next, as shown in FIG. 22, an assignment request is input from the assignment request input unit 21 wherein deletion of "2" virtual machines of which the capabilities are "3" is requested from a resource A at point-in-time T4. The request information extracting unit 22 of the control device 1A appends a request ID "R#4" for the virtual machines to the input assignment request.

Figure 25B:
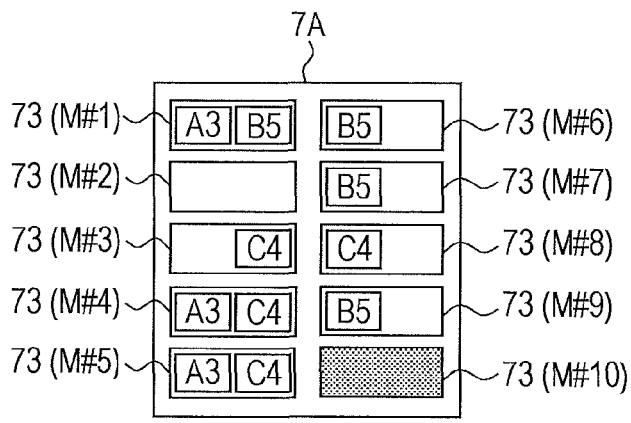

Next, as shown in FIG. 25B, the first design unit 26 of the control device 1A creates layout design information for deleting the virtual machines with management IDs "R#1-2" and "R#1-3" corresponding to the assignment request of R#4 from the physical machine 73 of the physical machine group 7. The first design unit 26 writes the created layout design information in the layout design information storage unit 35. Next, the first design unit 26 transmits the created layout design information to the creating unit 24. The creating unit 24 creates movement information based on the difference information of the layout design information. The creating unit 24 writes the created movement information in the arrangement information/movement information storage unit 36. Note that the movement information in FIG. 25B indicates deletion information.

In FIG. 25B, the first design unit 26 selects and deletes two optional virtual machines of the virtual machines with management IDs "R#1-1" through "R#1-5" via the arrangement unit/movement arrangement unit 38. The selected virtual machines with management IDs "R#1-2" and "R#1-3" are deleted from the physical machines 73 with physical machine IDs "M#2" and "M#3". Consequently, as shown in FIG. 25B, all of the virtual machines have been moved from the physical machine with physical machine ID "M#2".

In FIG. 25B, the second design unit 27A reads in the request information of all of the resources of the request information storage unit 33A, the physical machine information of the physical machine information storage unit 34, the layout information of the layout information storage unit 35, and the stand-by physical machine request information of the stand-by physical machine request information storage unit 37A via the second read-in unit 25A. Next, the second design unit 27A determines whether or not the physical machines 73 within the physical machine group 7 satisfy the stand-by physical machine request information.

In FIG. 25B, there are five or more physical machines 73 of which the remaining capabilities are equal to or greater than the stand-by physical machine request capability "5", and accordingly, the stand-by physical machine request information is satisfied.

Next, the second design unit 27A determines whether or not the number of physical machines 73 of which the remaining capabilities are equal to or greater than the stand-by physical machine request capability "5" is greater than the stand-by physical machine request count. In FIG. 25B, there are six physical machines 73 of which the remaining capabilities are equal to or greater than the stand-by physical machine request capability "5", which is determined to be greater than the stand-by physical machine request count "5".

Next, the second design unit 27A determines whether or not there is a physical machine 73 where no virtual machine is arranged of the six physical machines 73 of which the remaining capabilities are equal to or greater than the stand-by physical machine request capability "5".

Figure 26:
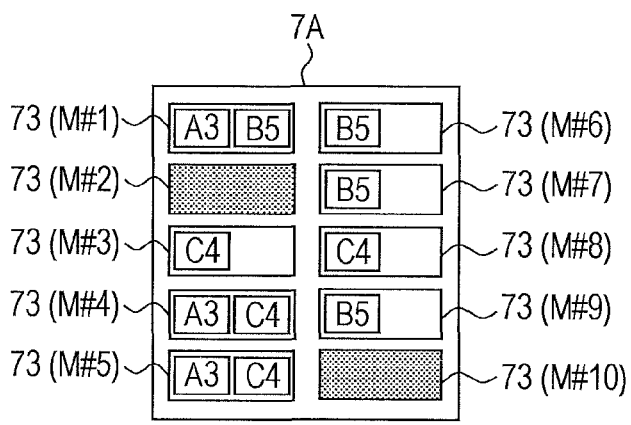
FIG. 26 is a diagram illustrating input of an assignment request according to the information processing system of the second embodiment.

In FIG. 26, determination is made that there is the physical machine 73 with physical machine ID "M#2".

Next, as shown in FIG. 26, the second design unit 27A turns off the power of the physical machine 73 with physical machine ID "M#2" via the power-on/power-off unit 28. The power of the physical machine 73 is turned off, whereby low power consumption of the information processing system 1000A including the data center 100A may be realized.

Next, again, the second design unit 27A determines whether or not the number of physical machines 73 of which the remaining capabilities are equal to or greater than the stand-by physical machine request capability "5". In FIG. 26, there are five physical machines 73 of which the remaining capabilities are equal to or greater than the stand-by physical machine request capability "5", which is not determined to be greater than the stand-by physical machine request count "5". Therefore, the control device 1A is in an assignment request input waiting state.

According to the method for changing the deployment of the virtual machine and the apparatus for changing the deployment of the virtual machine according to the second embodiment, in addition to the technique disclosed in the first embodiment, in the event that the total number is smaller than a predetermined number, the control device 1A selects physical machines 73 where multiple virtual machines are arranged of which the number is equivalent to an integer number of a half of difference between the predetermined number and the total number. According to such an arrangement, movement efficiency of a virtual machine as to a physical machine 73 may be improved as compared to the first embodiment.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present invention have been described in detail, it should be understood that the various changes, substitutions, and alterations could be made hereto without departing from the spirit and scope of the invention.

What is claimed is:

1. A method for changing a deployment of a virtual machine performed by a computer, at least one virtual machine being deployed respectively in M physical machines, the method comprising:
  obtaining, by the computer, a remaining capacity of each physical machine from among the M physical machines, each remaining capacity indicating how many more virtual machines can be deployed in the respective physical machine; and
  when a number of physical machines having a remaining capacity that is equal to or greater than a predetermined capacity is less than a predetermined number by N, changing, by the computer, the deployment of a virtual machine deployed in the M physical machines to M+N−1 or less physical machines among the M physical machines, M and N being integers equal to or greater than 1;
  wherein the changing is performed when the number of physical machines having a remaining capacity that is equal to or greater than the predetermined capacity reaches the predetermined number among the M+N−1 or less physical machines after the changing is performed.

2. The method according to claim 1, further comprising:
  turning on power of the M+N physical machines by the computer before the changing is performed; and
  turning off the power of more than one of the physical machines and turning on power of the M+N−1 or less physical machines by the computer after the changing is performed.

3. A method for changing a deployment of a virtual machine performed by a computer, at least one virtual machine being deployed respectively in M physical machines, the method comprising:
  obtaining, by the computer, a remaining capacity of each physical machine from among the M physical machines, each remaining capacity indicating how many more virtual machines can be deployed in the respective physical machine; and
  when a number of physical machines having a remaining capacity that is equal to or greater than a predetermined capacity is greater than a predetermined number by N, changing, by the computer, the deployment of a virtual machine deployed in the M physical machines to M−1 or less physical machines among the M physical machines, N being an integer equal to or greater than 1 and M being an integer equal or greater than 2;
  wherein the changing is performed when the number of physical machines having a remaining capacity that is equal to or greater than the predetermined capacity reaches the predetermined number among the M−1 or less physical machines after the changing is performed.

4. The method according to claim 3, further comprising:
  turning on power of the M physical machines by the computer before the changing is performed; and
  turning off the power of more than one of the physical machines and turning on power of the M−1 or less physical machines by the computer after the changing is performed.

5. An apparatus for changing a deployment of a virtual machine performed by a computer, at least one virtual machine being deployed respectively in M physical machines, the apparatus comprising:
  one or more processors configured to:
  obtain a remaining capacity of each physical machine from among the M physical machines, each remaining capacity indicating how many more virtual machines can be deployed in the respective physical machine; and
  when a number of physical machines having a remaining capacity that is equal to or greater than a predetermined capacity is less than a predetermined number by N, change the deployment of a virtual machine deployed in the M physical machines to M+N−1 or less physical machines among the M physical machines, M and N being integers equal to or greater than 1,
  wherein the changing is performed when the number of physical machines having a remaining capacity that is equal to or greater than the predetermined capacity reaches the predetermined number among the M+N−1 or less physical machines after the changing is performed.

6. The apparatus according to claim 5, further comprising:
  a power unit that turns on power of the M+N physical machines before the changing is performed and turns off the power of more than one of the physical machines and turning on power of the M+N−1 or less physical machines after the changing is performed.

7. An apparatus for changing a deployment of a virtual machine performed by a computer, at least one virtual machine being deployed respectively in M physical machines, the apparatus comprising:
  one or more processors configured to:
  obtain a remaining capacity of each physical machine from among the M physical machines, each remaining capacity indicating how many more virtual machines can be deployed in the respective physical machine; and
  when a number of physical machines having a remaining capacity that is equal to or greater than a predetermined capacity is greater than a predetermined number by N, change the deployment of a virtual machine deployed in the M physical machines to M−1 or less physical machines among the M physical machines, N being an integer equal to or greater than 1 and M being an integer equal or greater than 2,
  wherein the changing is performed when the number of physical machines having a remaining capacity that is equal to or greater than the predetermined capacity reaches the predetermined number among the M−1 or less physical machines after the changing is performed.

8. The apparatus according to claim 7, further comprising:
  a power unit that turns on power of the M physical machines before the changing is performed and turns off the power of more than one of the physical machines and turning on power of the M−1 or less physical machines after the changing is performed.

9. A non-transitory computer-readable non-transitory medium storing a program causing a computer to execute an operation for changing a deployment of a virtual machine performed by a computer, at least one virtual machine being deployed respectively in M physical machines, the operation comprising:
  obtaining, by the computer, a remaining capacity of each physical machine from among the M physical machines, each remaining capacity indicating how many more virtual machines can be deployed in the respective physical machine; and
  when a number of physical machines having a remaining capacity that is equal to or greater than a predetermined capacity is greater than a predetermined number by N, changing, by the computer, the deployment of a virtual machine deployed in the M physical machines to M−1 or less physical machines among the M physical machines, N being an integer equal to or greater than 1 and M being an integer equal or greater than 2;

wherein the changing is performed when the number of physical machines having a remaining capacity that is equal to or greater than the predetermined capacity reaches the predetermined number among the M+N−1 or less physical machines after the changing is performed.

10. A non-transitory computer-readable non-transitory medium storing a program causing a computer to execute an operation for changing a deployment of a virtual machine performed by a computer, at least one virtual machine being deployed respectively in M physical machines, the operation comprising:

obtaining, by the computer, a remaining capacity of each physical machine from among the M physical machines, each remaining capacity indicating how many more virtual machines can be deployed in the respective physical machine; and when a number of physical machines having a remaining capacity that is equal to or greater than a predetermined capacity is greater than a predetermined number by N, changing, by the computer, the deployment of a virtual machine deployed in the M physical machines to M−1 or less physical machines among the M physical machines, N being an integer equal to or greater than 1 and M being an integer equal or greater than 2;

wherein the changing is performed when the number of physical machines having a remaining capacity that is equal to or greater than the predetermined capacity reaches the predetermined number among the M−1 or less physical machines after the changing is performed.

* * * * *

UNITED STATES PATENT AND TRADEMARK OFFICE
CERTIFICATE OF CORRECTION

PATENT NO. : 8,850,023 B2
APPLICATION NO. : 13/398288
DATED : September 30, 2014
INVENTOR(S) : Hiroyuki Yamashima It is certified that error appears in the above-identified patent and that said Letters Patent is hereby corrected as shown below:

On the Title Page

Item (56), Column 2 (other publications), line 6, Delete "Evironments," and insert -- Environments, --, therefor.

Signed and Sealed this
Twenty-third Day of December, 2014

Michelle K. Lee
*Deputy Director of the United States Patent and Trademark Office*